(12) United States Patent
Nam et al.

(10) Patent No.: US 11,695,466 B2
(45) Date of Patent: Jul. 4, 2023

(54) RECONFIGURABLE INTELLIGENT SURFACE OR REPEATER ASSISTED SYNCHRONIZATION SIGNAL BLOCK TRANSMISSION AND INITIAL ACCESS

(71) Applicant: QUALCOMM Incorporated, San Diego, CA (US)

(72) Inventors: Wooseok Nam, San Diego, CA (US); Yucheng Dai, San Diego, CA (US); Tao Luo, San Diego, CA (US); Peter Gaal, San Diego, CA (US); Junyi Li, Fairless Hills, PA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/448,016

(22) Filed: Sep. 17, 2021

(65) Prior Publication Data

US 2023/0093595 A1    Mar. 23, 2023

(51) Int. Cl.
*H04W 56/00* (2009.01)
*H04B 7/155* (2006.01)
*H04B 7/06* (2006.01)

(52) U.S. Cl.
CPC ....... *H04B 7/15507* (2013.01); *H04B 7/0639* (2013.01); *H04W 56/0035* (2013.01)

(58) Field of Classification Search
CPC . H04B 7/00; H04B 7/06; H04B 7/155; H04B 7/0626; H04B 7/0639; H04B 7/15507; H04B 17/336; H04L 1/00; H04L 1/18; H04L 5/00; H04L 5/16; H04L 12/26; H04W 24/10; H04W 52/14; H04W 52/36; H04W 52/146; H04W 56/00; H04W 56/0035; H04W 72/04; H04W 72/12; H04W 88/06

(Continued)

(56) References Cited

U.S. PATENT DOCUMENTS

| 2021/0297135 | A1* | 9/2021 | Kim ..................... H04B 7/0617 |
| 2022/0003830 | A1* | 1/2022 | Cha ........................ H04B 17/24 |
| 2022/0014935 | A1* | 1/2022 | Haija ................... H04B 17/336 |

FOREIGN PATENT DOCUMENTS

| WO | 2021067784 A1 | 4/2021 |
| WO | 2021179965 A1 | 9/2021 |

OTHER PUBLICATIONS

International Search Report and Written Opinion—PCT/US2022/076173—ISA/EPO—dated Dec. 15, 2022.

(Continued)

*Primary Examiner* — Shawkat M Ali
(74) *Attorney, Agent, or Firm* — Qualcomm Incorporated

(57) ABSTRACT

Various aspects of the present disclosure generally relate to wireless communication. In some aspects, a user equipment (UE) may receive a synchronization signal block (SSB) transmitted by a base station. The UE may receive system information that includes reconfigurable intelligent surface (RIS) or repeater assisted initial access information that identifies a set of SSBs that are associated with an RIS or a repeater and a modulation signature associated with the RIS or the repeater. The UE may selectively perform initial access using the SSB or search for another SSB based at least in part on the RIS or repeater assisted initial access information. Numerous other aspects are described.

30 Claims, 15 Drawing Sheets

(58) Field of Classification Search
USPC ............... 375/219, 260, 262, 267, 295, 316
See application file for complete search history.

(56) References Cited

OTHER PUBLICATIONS

Wu Q., et al., "Intelligent Reflecting Surface Enhanced Wireless Network: Joint Active and Passive Beamforming Design", 2018 IEEE Global Communications Conference (Globecom), IEEE, Dec. 9, 2018 (Dec. 9, 2018), pp. 1-6, XP033519782, DOI: 10.1109/ GLOCOM.2018.8647620 [retrieved on Feb. 20, 2019] abstract, paragraph [000I], figure 1.

* cited by examiner

RECONFIGURABLE INTELLIGENT SURFACE OR REPEATER ASSISTED SYNCHRONIZATION SIGNAL BLOCK TRANSMISSION AND INITIAL ACCESS

FIELD OF THE DISCLOSURE

Aspects of the present disclosure generally relate to wireless communication and to techniques and apparatuses for reconfigurable intelligent surface (RIS) or repeater assisted synchronization signal block (SSB) transmission and initial access.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The user equipment may include a memory and one or more processors coupled to the memory. The one or more processors may be configured to receive a synchronization signal block (SSB) transmitted by a base station. The one or more processors may be configured to receive system information that includes reconfigurable intelligent surface (RIS) or repeater assisted initial access information that identifies a set of SSBs that are associated with an RIS or a repeater and a modulation signature associated with the RIS or the repeater. The one or more processors may be configured to selectively perform initial access using the SSB or search for another SSB based at least in part on the RIS or repeater assisted initial access information.

Some aspects described herein relate to a base station for wireless communication. The base station may include a memory and one or more processors coupled to the memory. The one or more processors may be configured to transmit an SSB burst set including a first set of SSBs associated with direct transmission from the base station and a second set of SSBs associated with an RIS or a repeater. The one or more processors may be configured to transmit system information including RIS or repeater assisted initial access information that identifies the second set of SSBs and a modulation signature associated with the RIS or the repeater.

Some aspects described herein relate to a base station for wireless communication. The base station may include a memory and one or more processors coupled to the memory. The one or more processors may be configured to transmit one or more first SSBs associated with an RIS or a repeater on a beam directed toward the RIS or the repeater at a first power. The one or more processors may be configured to transmit a second SSB associated with direct transmission from the base station, on a same beam as the one or more first SSBs or on a beam close to the beam on which the one or more first SSBs are transmitted, at a second power that is higher than the first power.

Some aspects described herein relate to an RIS for wireless communication. The reconfigurable intelligent surface may include a memory and one or more processors coupled to the memory. The one or more processors may be configured to receive, from a base station, an indication of a modulation signature associated with the RIS. The one or more processors may be configured to receive, from the base station, a set of SSBs associated with the RIS. The one or more processors may be configured to redirect each SSB of the set of SSBs and modulate each SSB of the set of SSBs using the modulation signature associated with the RIS.

Some aspects described herein relate to a method of wireless communication performed by a UE. The method may include receiving an SSB transmitted by a base station. The method may include receiving system information that includes RIS or repeater assisted initial access information that identifies a set of SSBs that are associated with an RIS or a repeater and a modulation signature associated with the RIS or the repeater. The method may include selectively performing initial access using the SSB or searching for another SSB based at least in part on the RIS or repeater assisted initial access information.

Some aspects described herein relate to a method of wireless communication performed by a base station. The method may include transmitting an SSB burst set including a first set of SSBs associated with direct transmission from the base station and a second set of SSBs associated with an RIS or a repeater. The method may include transmitting system information including RIS or repeater assisted initial access information that identifies the second set of SSBs and a modulation signature associated with the RIS or the repeater.

Some aspects described herein relate to a method of wireless communication performed by a base station. The method may include transmitting one or more first SSBs associated with an RIS or a repeater on a beam directed toward the RIS or the repeater at a first power. The method may include transmitting a second SSB associated with direct transmission from the base station, on a same beam as the one or more first SSBs or on a beam close to the beam on which the one or more first SSBs are transmitted, at a second power that is higher than the first power.

Some aspects described herein relate to a method of wireless communication performed by an RIS. The method may include receiving, from a base station, an indication of a modulation signature associated with the RIS. The method may include receiving, from the base station, a set of SSBs associated with the RIS. The method may include redirecting each SSB of the set of SSBs and modulating each SSB of the set of SSBs using the modulation signature associated with the RIS.

Some aspects described herein relate to a non-transitory computer-readable medium that stores a set of instructions for wireless communication by a UE. The set of instructions, when executed by one or more processors of the UE, may cause the UE to receive an SSB transmitted by a base station. The set of instructions, when executed by one or more processors of the UE, may cause the UE to receive system information that includes RIS or repeater assisted initial access information that identifies a set of SSBs that are associated with an RIS or a repeater and a modulation signature associated with the RIS or the repeater. The set of instructions, when executed by one or more processors of the UE, may cause the UE to selectively perform initial access using the SSB or search for another SSB based at least in part on the RIS or repeater assisted initial access information.

Some aspects described herein relate to a non-transitory computer-readable medium that stores a set of instructions for wireless communication by a base station. The set of instructions, when executed by one or more processors of the base station, may cause the base station to transmit an SSB burst set including a first set of SSBs associated with direct transmission from the base station and a second set of SSBs associated with an RIS or a repeater. The set of instructions, when executed by one or more processors of the base station, may cause the base station to transmit system information including RIS or repeater assisted initial access information that identifies the second set of SSBs and a modulation signature associated with the RIS or the repeater.

Some aspects described herein relate to a non-transitory computer-readable medium that stores a set of instructions for wireless communication by a base station. The set of instructions, when executed by one or more processors of the base station, may cause the base station to transmit one or more first SSBs associated with an RIS or a repeater on a beam directed toward the RIS or the repeater at a first power. The set of instructions, when executed by one or more processors of the base station, may cause the base station to transmit a second SSB associated with direct transmission from the base station, on a same beam as the one or more first SSBs or on a beam close to the beam on which the one or more first SSBs are transmitted, at a second power that is higher than the first power.

Some aspects described herein relate to a non-transitory computer-readable medium that stores a set of instructions for wireless communication by an RIS. The set of instructions, when executed by one or more processors of the RIS, may cause the RIS to receive, from a base station, an indication of a modulation signature associated with the RIS. The set of instructions, when executed by one or more processors of the RIS, may cause the RIS to receive, from the base station, a set of SSBs associated with the RIS. The set of instructions, when executed by one or more processors of the RIS, may cause the RIS to redirect each SSB of the set of SSBs and modulate each SSB of the set of SSBs using the modulation signature associated with the RIS.

Some aspects described herein relate to an apparatus for wireless communication. The apparatus may include means for receiving an SSB transmitted by a base station. The apparatus may include means for receiving system information that includes RIS or repeater assisted initial access information that identifies a set of SSBs that are associated with an RIS or a repeater and a modulation signature associated with the RIS or the repeater. The apparatus may include means for selectively performing initial access using the SSB or searching for another SSB based at least in part on the RIS or repeater assisted initial access information.

Some aspects described herein relate to an apparatus for wireless communication. The apparatus may include means for transmitting an SSB burst set including a first set of SSBs associated with direct transmission from the base station and a second set of SSBs associated with an RIS or a repeater. The apparatus may include means for transmitting system information including RIS or repeater assisted initial access information that identifies the second set of SSBs and a modulation signature associated with the RIS or the repeater.

Some aspects described herein relate to an apparatus for wireless communication. The apparatus may include means for transmitting one or more first SSBs associated with an RIS or a repeater on a beam directed toward the RIS or the repeater at a first power. The apparatus may include means for transmitting a second SSB associated with direct transmission from the base station, on a same beam as the one or more first SSBs or on a beam close to the beam on which the one or more first SSBs are transmitted, at a second power that is higher than the first power.

Some aspects described herein relate to an apparatus for wireless communication. The apparatus may include means for receiving, from a base station, an indication of a modulation signature associated with the RIS. The apparatus may include means for receiving, from the base station, a set of SSBs associated with the RIS. The apparatus may include means for redirecting each SSB of the set of SSBs and modulating each SSB of the set of SSBs using the modulation signature associated with the RIS.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
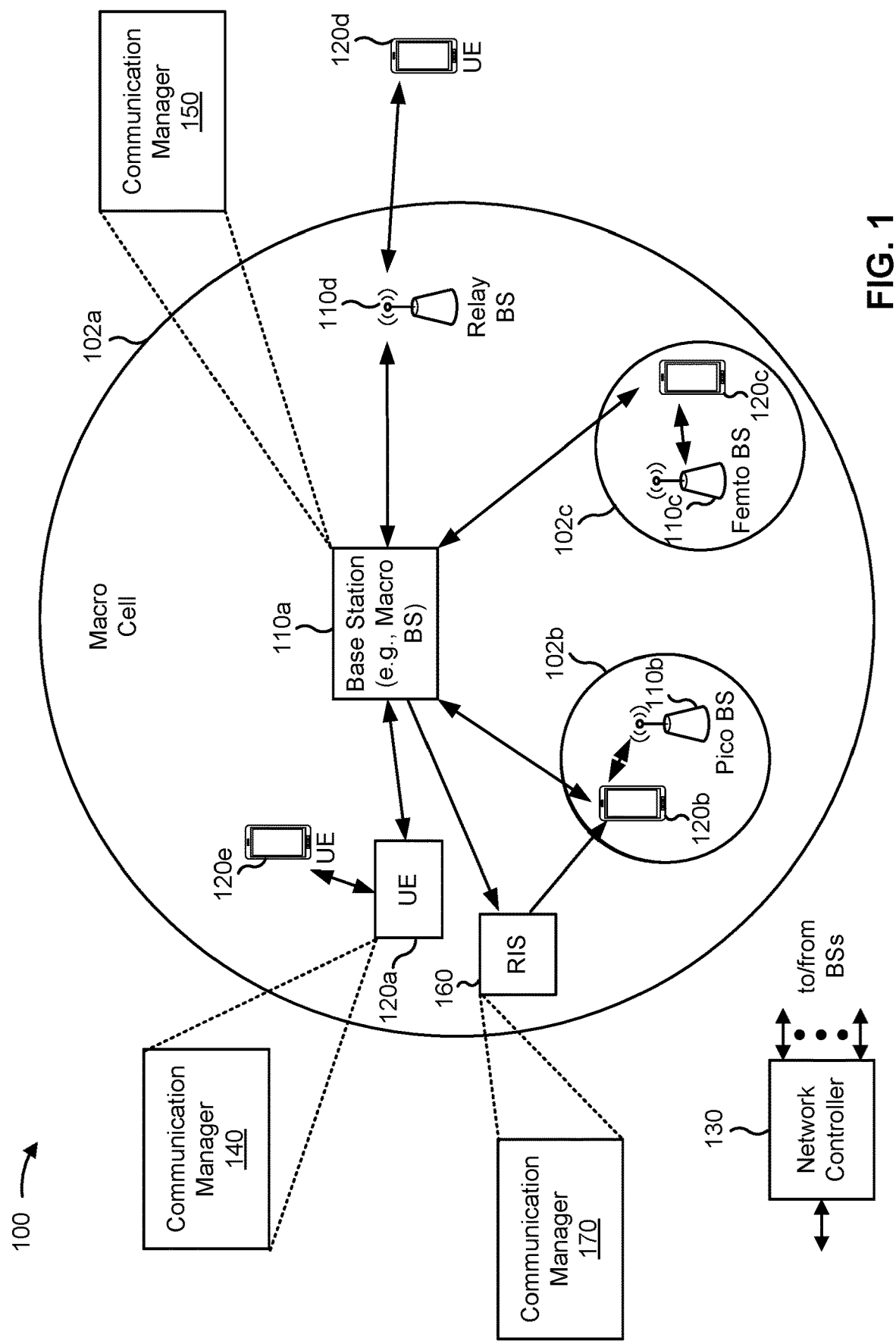
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a synchronization signal block (SSB) transmitted by a base station; receive system information that includes reconfigurable intelligent surface (RIS) or repeater assisted initial access information that identifies a set of SSBs that are associated with an RIS or a repeater and a modulation signature associated with the RIS or the repeater; and selectively perform initial access using the SSB or search for another SSB based at least in part on the RIS or repeater assisted initial access information. Additionally, or alternatively, the communication manager 140 may perform one or more other operations described herein.

In some aspects, the base station 110 may include a communication manager 150. As described in more detail elsewhere herein, the communication manager 150 may transmit an SSB burst set including a first set of SSBs associated with direct transmission from the base station and a second set of SSBs associated with an RIS or a repeater; and transmit system information including RIS or repeater assisted initial access information that identifies the second set of SSBs and a modulation signature associated with the RIS or the repeater. Additionally, or alternatively, the communication manager 150 may perform one or more other operations described herein.

In some aspects, as described in more detail elsewhere herein, the communication manager 150 may transmit one or more first SSBs associated with an RIS or a repeater on a beam directed toward the RIS or the repeater at a first power; and transmit a second SSB associated with direct transmission from the base station, on a same beam as the one or more first SSBs or on a beam close to the beam on which the one or more first SSBs are transmitted, at a second power that is higher than the first power. Additionally, or alternatively, the communication manager 150 may perform one or more other operations described herein.

As shown in FIG. 1, the wireless network 100 may include an RIS 160. The RIS 160 may include a communication manager 170. The RIS 160 may include one or more reconfigurable elements capable of redirecting or reflecting signals transmitted by a base station 110 or a UE 120.

In some aspects, as described in more detail elsewhere herein, the communication manager 170 of the MS 160 may receive, from a base station, an indication of a modulation signature associated with the RIS 160; receive, from the base station, a set of SSBs associated with the RIS 160; and redirect each SSB of the set of SSBs and modulate each SSB of the set of SSBs using the modulation signature associated with the RIS 160. Additionally, or alternatively, the communication manager 170 may perform one or more other operations described herein.

As indicated above, FIG. 1 is provided as an example. Other examples may differ from what is described with regard to FIG. 1.

Figure 2:
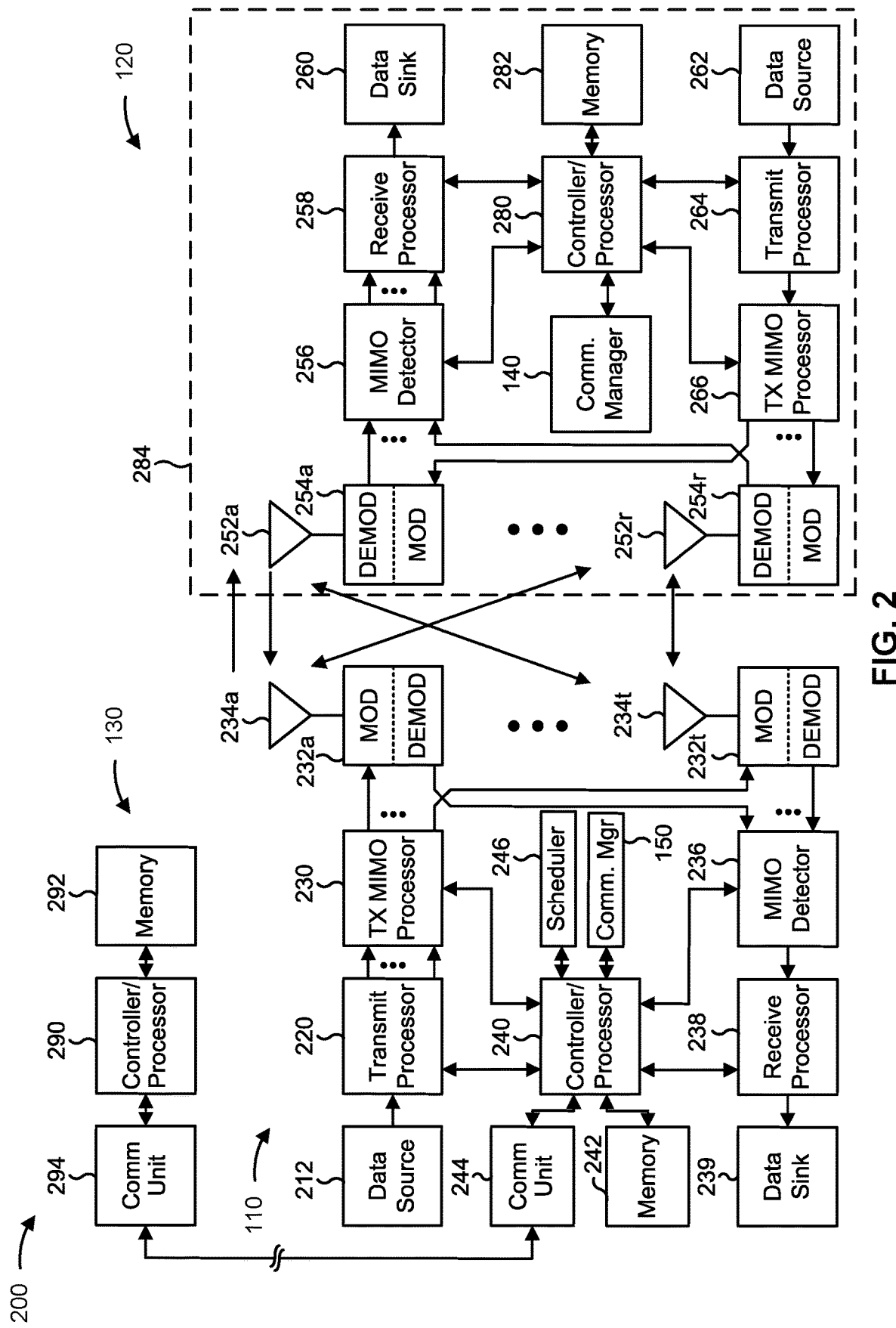
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T>1). The UE 120 may be equipped with a set of antennas 252a through 252r, such as R antennas (R>1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-15).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-15).

The controller/processor 240 of the base station 110, the controller/processor 280 of the UE 120, and/or any other component(s) of FIG. 2 may perform one or more techniques associated with RIS or repeater assisted SSB transmission and initial access, as described in more detail elsewhere herein. For example, the controller/processor 240 of the base station 110, the controller/processor 280 of the UE 120, and/or any other component(s) of FIG. 2 may perform or direct operations of, for example, process 900 of FIG. 9, process 1000 of FIG. 10, process 1100 of FIG. 11, process 1200 of FIG. 12, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, process 1100 of FIG. 11, process 1200 of FIG. 12, and/or other processes as described herein. In some examples, executing instructions may include running the instructions, converting the instructions, compiling the instructions, and/or interpreting the instructions, among other examples.

In some aspects, the UE 120 includes means for receiving an SSB transmitted by a base station; means for receiving system information that includes RIS or repeater assisted initial access information that identifies a set of SSBs that are associated with an RIS or a repeater and a modulation signature associated with the RIS or the repeater; and/or means for selectively performing initial access using the SSB or searching for another SSB based at least in part on the RIS or repeater assisted initial access information. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for transmitting an SSB burst set including a first set of SSBs associated with direct transmission from the base station and a second set of SSBs associated with an MS or a repeater; and/or means for transmitting system information including MS or repeater assisted initial access information that identifies the second set of SSBs and a modulation signature associated with the RIS or the repeater. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the base station 110 includes means for transmitting one or more first SSBs associated with an RIS or a repeater on a beam directed toward the RIS or the repeater at a first power; and/or means for transmitting a second SSB associated with direct transmission from the base station, on a same beam as the one or more first SSBs or on a beam close to the beam on which the one or more first SSBs are transmitted, at a second power that is higher than the first power. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, an RIS includes means for receiving, from a base station, an indication of a modulation signature associated with the RIS; means for receiving, from the base station, a set of SSBs associated with the RIS; means for redirecting each SSB of the set of SSBs; and/or means for modulating each SSB of the set of SSBs using the modulation signature associated with the RIS. In some aspects, the means for the RIS to perform operations described herein may include, for example, one or more of communication manager 170, a transmit processor, an antenna, a modem, a receive processor, a controller/processor, a memory, and/or one or more reconfigurable elements.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
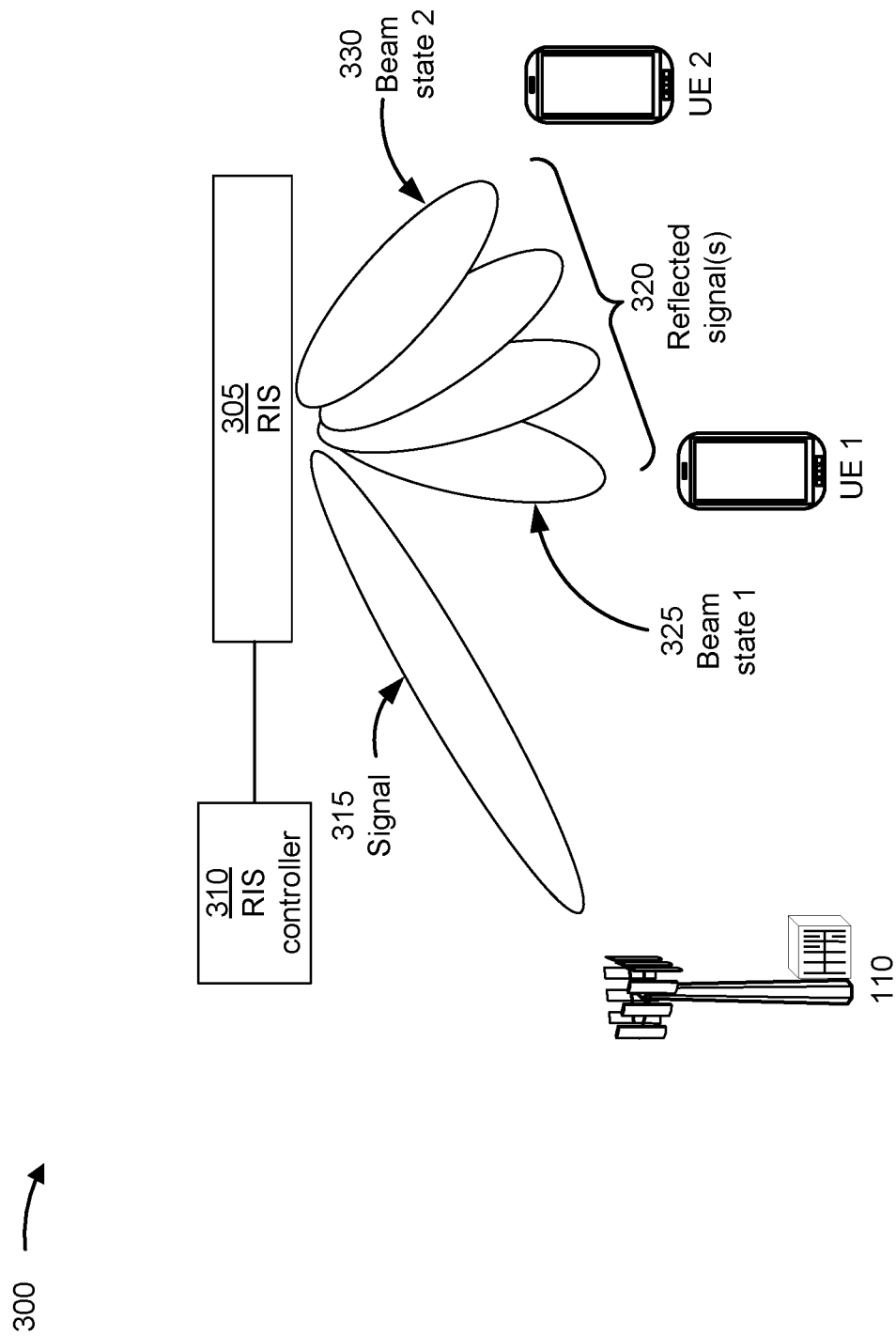
FIG. 3 is a diagram illustrating an example of communications using a reconfigurable intelligent surface (RIS), in accordance with the present disclosure.

FIG. 3 is a diagram illustrating an example 300 of communications using an RIS, in accordance with the present disclosure. As shown in FIG. 3, a base station 110 may communicate with a UE 120 in a wireless network, such as the wireless network 100. The base station 110 and the UE 120 may use an RIS 305 to communicate with one another. For example, the RIS 305 may reflect or redirect a signal to the base station 110 and/or the UE 120. The RIS 305 may also be referred to as an intelligent reflecting surface. In some examples, the RIS 305 may be a repeater.

The RIS 305 may be, or may include, a planar or two-dimensional structure or surface that is designed to have properties to enable a dynamic control of signals or electromagnetic waves reflected and/or redirected by the RIS 305. The RIS 305 may include one or more reconfigurable elements. For example, the RIS 305 may include an array of reconfigurable elements (e.g., an array of uniformly distributed reconfigurable elements). The reconfigurable elements may be elements with a reconfigurable electromagnetic characteristic. For example, the electromagnetic characteristic may include a reflection characteristic (e.g., a reflection coefficient), a scattering characteristic, an absorption characteristic, and/or a diffraction characteristic. The electromagnetic characteristic(s) of each reconfigurable element may be independently controlled and changed over time. The electromagnetic characteristic(s) of each reconfigurable element may be independently configured such that the combination of configured states of the reconfigurable elements reflects an incident signal or waveform in a controlled manner. For example, the reconfigurable elements may be configured to reflect or redirect an impinging signal in a controlled manner, such as by reflecting the impinging signal in a desired direction, with a desired beam width, with a desired phase, with a desired amplitude, and/or with a desired polarization, among other examples. In other words, the RIS 305 may be capable of modifying one or more properties (e.g., direction, beam width, phase, amplitude, and/or polarization) of an impinging signal.

The reconfigurable elements of the RIS 305 may be controlled and/or configured by an RIS controller 310. The RIS controller 310 may be a control module (e.g., a controller and/or a processor) that is capable of configuring the electromagnetic characteristic(s) of each reconfigurable element of the RIS 305. The RIS controller 310 may be, or may be included in, the communication manager 170. Alternatively, the communication manager 170 may be included in the RIS controller 310. The RIS controller 310 may receive control communications (e.g., from a base station 110 and/or a UE 120) indicating one or more properties of reflected signals (e.g., indicating a desired direction, a desired beam width, a desired phase, a desired amplitude, and/or a desired polarization). Therefore, in some examples, the RIS 305 may be capable of receiving communications (e.g., via the RIS 305 and/or the RIS controller 310). In some examples, the RIS 305 and/or the RIS controller 310 may not have transmit capabilities (e.g., the RIS 305 may be capable of reflecting and/or redirecting impinging signals, via the reconfigurable elements, and modifying the reflected signals, but may not be capable of generating and/or transmitting signals). Due to the capability of the RIS 305 to receive communications (e.g., via the RIS 305 and/or the RIS controller 310), the RIS 305 may recover partial synchronization with other wireless communication nodes (e.g., a base station 110 and/or a UE 120). For example, the RIS 305 may acquire and track a frame structure (e.g., downlink or uplink frame structure) and/or slot or symbol boundaries, among other examples.

As shown in FIG. 3, the base station 110 may transmit a signal 315. The signal 315 may be transmitted in a spatial direction toward the RIS 305. The RIS controller 310 may configure the reconfigurable elements of the RIS 305 to reflect and/or redirect the signal 315 in a desired spatial direction and/or with one or more desired signal characteristics (e.g., beam width, phase, amplitude, frequency, and/or polarization). For example, as shown by reference number 320, the RIS 305 may be capable of reflecting the signal 315 in one or more spatial directions. Although multiple beams are shown in FIG. 3 representing different beam states or beam directions of the RIS 305, the RIS 305 may be capable of reflecting a signal with one beam state or one beam direction at a time. For example, in one case, as shown by reference number 325, the RIS 305 may be configured to reflect the signal 315 using a first beam state (e.g., beam state 1). "Beam state" may refer to a spatial direction and/or a beam of a reflected signal (e.g., a signal reflected by the RIS 305). The first beam state may cause the signal 315 to be reflected in a spatial direction toward a first UE 120 (e.g., UE 1). As shown by reference number 330, in another case, the RIS 305 may be configured to reflect the signal 315 using a second beam state (e.g., beam state 2). The second beam state may cause the signal 315 to be reflected in a spatial direction toward a second UE 120 (e.g., UE 2).

The RIS 305 may be deployed in a wireless network (such as the wireless network 100) to improve communication performance and efficiency. For example, the RIS 305 may enable a transmitter (e.g., a base station 110 or a UE 120) to control the scattering, reflection, and refraction characteristics of signals transmitted by the transmitter, to overcome the negative effects of wireless propagation. For example, the RIS 305 may effectively control signal characteristics (e.g., spatial direction, beam width, phase, amplitude, frequency, and/or polarization) of an impinging signal without a need for complex decoding, encoding, and radio frequency processing operations. Therefore, the RIS 305 may provide increased channel diversity for propagation of signals in a wireless network. The increased channel diversity provides robustness to channel fading and/or blocking, such as when higher frequencies are used by the base station 110 and/or the UE 120 (e.g., millimeter wave frequencies and/or subterahertz frequencies). Moreover, as the RIS 305 does not need to perform complex decoding, encoding, and radio frequency processing operations, the RIS 305 may provide a more cost and energy efficient manner of reflecting and/or redirecting signals in a wireless network (e.g., as compared with other mechanisms for reflecting and/or redirecting signals, such as a relay device).

As indicated above, FIG. 3 is provided as an example. Other examples may differ from what is described with respect to FIG. 3.

Figure 4:
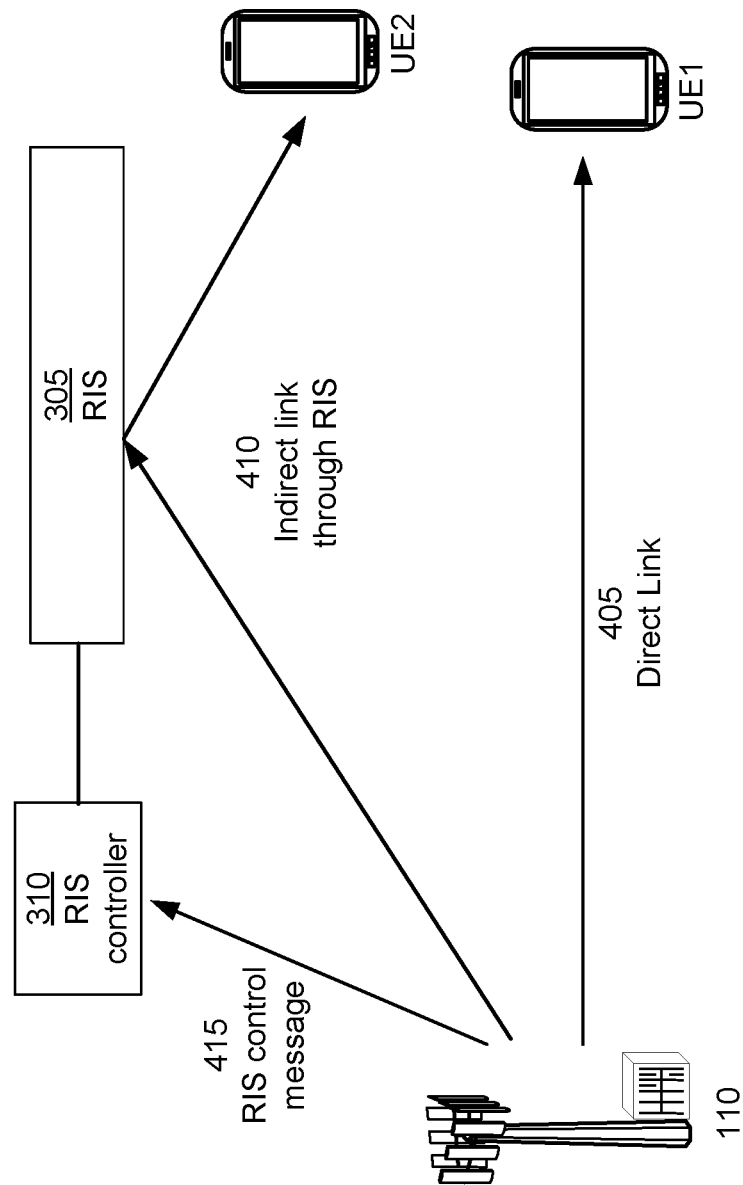
FIG. 4 is a diagram illustrating an example of communication links in a wireless network that includes an RIS, in accordance with the present disclosure.

FIG. 4 is a diagram illustrating an example 400 of communication links in a wireless network that includes an RIS, in accordance with the present disclosure. As shown, example 400 includes a base station 110, a first UE 120 (e.g., UE 1), a second UE 120 (e.g., UE 2), and the RIS 305. The RIS 305 may be controlled and/or configured by the RIS controller 310.

As shown in FIG. 4, some UEs 120, such as UE 1), may receive a communication (e.g., data and/or control information) directly from the base station 110 as a downlink communication. Additionally, or alternatively, some UEs 120, such as UE 2, may receive a communication (e.g., data and/or control information) indirectly from the base station 110 via the RIS 305. For example, the base station 110 may transmit the communication in a spatial direction toward the RIS 305, and the RIS 305 may redirect or reflect the communication to UE 2.

In some examples, UE 1 may communicate directly with the base station 110 via a direct link 405. For example, a communication may be transmitted via the direct link 405. A communication transmitted via the direct link 405 between UE 1 and the base station 110 does not pass through and is not reflected or redirected by the RIS 305. In some examples, UE 2 may communicate indirectly with the base station 110 via an indirect link 410. For example, a communication may be transmitted via different segments of the indirect link 410. In some cases, the base station 110 may establish indirect links 410 through the MS 305 with one or more UEs 120 out of a coverage area of the base station 110 and/or with one or more UEs for which a direct link 405 is blocked by an obstacle. A communication transmitted via the indirect link 410 between UE 2 and the base station 110 is reflected and/or redirected by the RIS 305. As shown in FIG. 4 and by reference number 415, the base station 110 may communicate with the RIS 305 (e.g., with the RIS controller 310) via a control channel. For example, the base station 110 may indicate, in an RIS control message, spatial direction(s) and/or signal characteristics for signals reflected by the RIS 305. The RIS controller 310 may configure reconfigurable elements of the RIS 305 in accordance with the RIS control message. In some examples, the RIS control message may indicate information associated with the wireless network, such as a frame structure (e.g., uplink or downlink frame structure), time synchronization information, and/or slot (and/or symbol) boundaries, among other examples. For example, the base station 110 may transmit the RIS control message to the RIS controller 310 and data to UE 2 via the indirect link 410. The RIS control message may be received by the RIS controller 310 and terminated at the RIS 305 (e.g., not delivered to UE 2). The RIS control message may indicate, to the RIS controller 310, a configuration of the RIS 305 for a desired state (e.g., reflection angle) that enables the data reflected and/or redirected by the RIS 305 to be reliably received by UE 2. Using the communication scheme shown in FIG. 4 may improve network performance and increase reliability by providing the UEs 120 with link diversity for communicating with the base station 110.

As indicated above, FIG. 4 is provided as an example. Other examples may differ from what is described with respect to FIG. 4.

Figure 5:
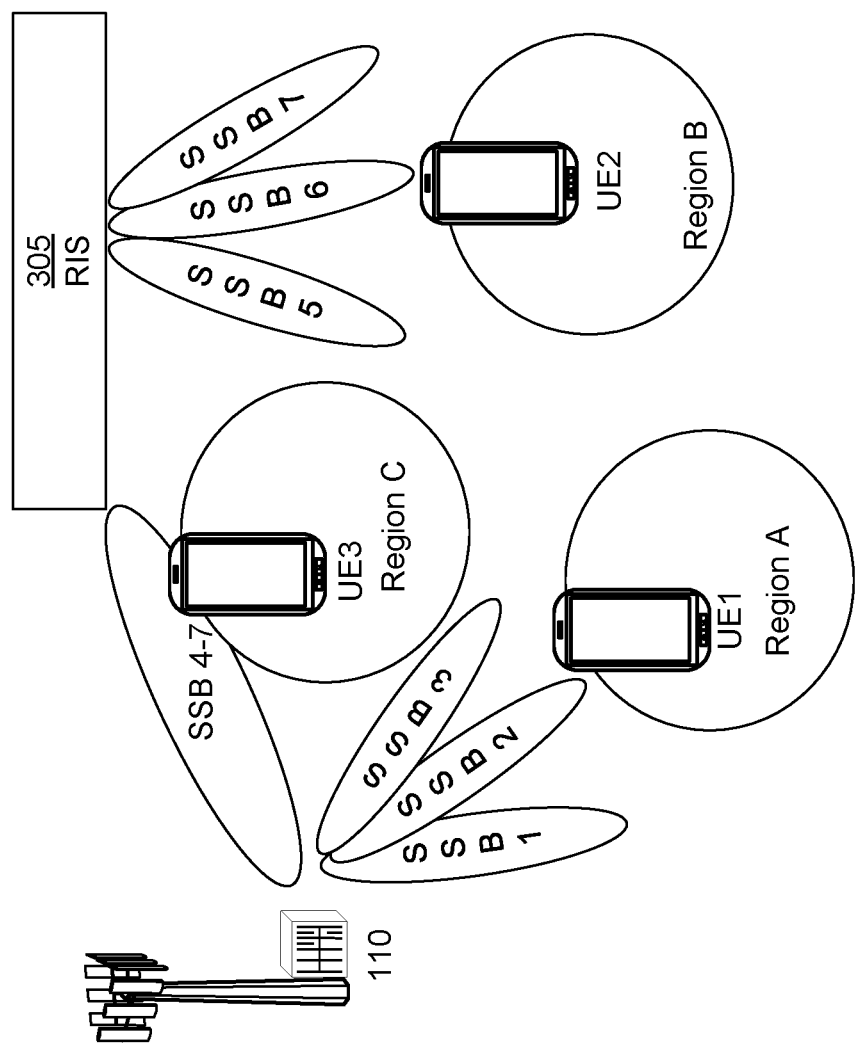
FIG. 5 is a diagram illustrating an example of synchronization signal block (SSB) transmission in a wireless network that includes an RIS, in accordance with the present disclosure.

FIG. 5 is a diagram illustrating an example 500 of SSB transmission in a wireless network that includes an RIS, in accordance with the present disclosure. As shown, example 400 includes a base station 110, a first UE 120 (e.g., UE 1), a second UE 120 (e.g., UE 2), a third UE 120 (e.g., UE 3), and the RIS 305.

The base station 110 may periodically transmit (e.g., broadcast) an SSB burst set that includes multiple SSBs. In some examples, different SSBs in an SSB burst set may be beam-formed differently (e.g., transmitted using different beams), and the SSBs may be used for initial cell search, cell acquisition, beam management, and/or beam selection (e.g., as part on an initial access procedure). An SSB may include a PSS, an SSS, and a physical broadcast channel (PBCH). A UE 120 may use the PSS to determine subframe/symbol timing of the base station 110 and to determine a physical layer identity. The UE may use the SSS to determine a physical layer cell identity group number and radio frame timing. The PBCH may carry a master information block (MIB) that provides system information for initial access (e.g., how to receive remaining minimum system information (RMSI)), as well as timing information including an SSB index. In some examples, the SSB index may correspond to a beam used to carry the SSB. A UE 120 may monitor for and/or measure SSBs using different receive (Rx) beams during an initial network access procedure and/or cell search procedure. The UE 120 may indicate one or more SSBs with a best signal parameter (e.g., an RSRP parameter) to the base station. The base station 110 and the UE 120 may use the one or more indicated SSBs to select one or more beams to be used for communication between the base station and the UE (e.g., for a random access channel (RACH) procedure). For example, the UE 120 may transmit a first message (e.g., Msg 1) of the RACH procedure to the base station 110 using a RACH resource associated with an SSB with the best signal parameter. Additionally, or alternatively, the UE 120 may use the SSB and/or the SSB index to determine a cell timing for a cell via which the SSB is received (e.g., a serving cell).

As shown in FIG. 5, the total SSB burst set, transmitted by the base station 110, may be partitioned into multiple sets of SSBs. For example, the SSB burst set may include a set of SSBs (e.g., SSB 1, SSB 2, SSB 3, and SSB 4) for direct transmission from the base station 110, and another set of SSBs (e.g., SSB 5, SSB, 6, and SSB 7) for transmission through the RIS 305. In some cases, if there are multiple RISs in a cell associated with the base station 110, there may be a respective set of SSBs dedicated for each RIS in the cell. The base station 110 may perform beam sweeping with the SSBs in the set of SSBs for direct transmission from the base station 110. For example, the base station 110 may transmit SSB 1, SSB 2, SSB 3, and SSB 4 on different beams having different beam directions. The RIS 305 may perform SSB beam sweeping on behalf of the base station 110 by changing the reflection state of the RIS 305 to redirect/reflect the SSBs in the set of SSBs for transmission through the RIS 305 at different reflection angles. For example, the base station 110 may transmit SSB 5, SSB 6, and SSB 7 on a beam directed towards the RIS 305, and the RIS 305 may redirect SSB 5, SSB 6, and SSB 7 at different reflection angles associated with different reflection states of the RIS 305.

As shown in FIG. 5, SSB 1, SSB 2, and SSB 3 may be used to serve UEs 120 in region A (e.g., UE 1). SSB 4 may be used to serve UEs 120 in region C (e.g., UE 3). SSB 5, SSB 6, and SSB 7 may be used to serve UEs 120 in region B (e.g., UE 2) through the RIS 305. In some examples, region B may be out of a coverage area of the base station 110. In some cases, an SSB (e.g., SSB 4) for direct transmission from the base station 110 may be transmitted, by the base station 110, in a same direction or in a similar direction as the set of SSBs (e.g., SSB 5, SSB 6, and SSB 7) for transmission through the RIS. For example, the base station 110 may transmit SSB 4, SSB 5, SSB 6, and SSB 7 on physically the same beam, or the base station 110 may transmit SSB 4 on a beam close to the beam used for transmitting SSB 5, SSB 6, and SSB 7, such that SSB 5, SSB 6, and SSB 7 pass through at least a portion of Region C (e.g., the coverage area associated with SSB 4). In this case, although SSBs 5-7 pass through Region C when transmitted in the direction toward the RIS 305, SSBs 5-7 are not be intended to serve Region C. SSB 4 may be transmitted in the direction toward the RIS 305, but SSB 4 is not reflected (or relayed) by the RIS 305.

In some examples, UE 3 in region C may observe or detect any (or all) of SSBs 4-7, and UE 3 may attempt to perform initial access using RACH resources associated with any (or all) of SSBs 4-7. In this case, although only SSB 4 is intended for region C, UE 3 may not be able to distinguish SSB 4 from the other SSBs (e.g., SSBs 5-7) that are intended for the RIS 305. If UE 3 attempts to perform initial access using SSB 5, SSB 6, and/or SSB 7 (e.g., using the RACH resources associated with SSB 5, SSB 6, and/or SSB 7), the base station may assume that UE 3 is in region B and served by the RIS 305. This may lead to the base station 110 transmitting RIS control messages to the RIS 305 for transmissions to (and/or from) UE 3 (which do not need to be reflected by the RIS 305), resulting in unnecessary control signaling overhead. Furthermore, signals transmitted to UE 3 may be unnecessarily reflected or redirected to region B, resulting in increased interference to other UEs in region B.

Some techniques and apparatuses described herein enable a base station to transmit an SSB burst set including a first set of SSBs associated with direct transmission from the base station and a second set of SSBs associated with an RIS. The base station may transmit system information including RIS-assisted initial access information that identifies the second set of SSBs and a modulation signature associated with the RIS. In some aspects, a UE may receive an SSB block transmitted by the base station, and the UE may receive the system information that includes the RIS-assisted initial access information that identifies the second set of SSBs and the modulation signature associated with the MS. The UE may selectively perform initial access using the SSB or search for another SSB based at least in part on the MS-assisted initial access information. An RIS may redirect the SSBs in the second set of SSBs, and the MS may modulate the SSBs in the second set of SSBs using the modulation signature associated with the RIS. In some aspects, in connection with a determination that the SSB is in the second set of SSBs, the UE may detect whether the SSB received by the UE is modulated with the modulation signature associated with the RIS, and the UE may select whether to perform initial access using the SSB or search for another SSB based at least in part on detecting whether the SSB is modulated with the modulation signature associated with the RIS. As a result, the UE may avoid attempting to perform initial access using an SSB associated with the RIS before the SSB has been redirected by the RIS. This may reduce unnecessary control signaling overhead for the base station, and may reduce interference to other UEs resulting from unnecessarily redirecting signals for the UE to a region other than the region where the UE is located.

Some techniques and apparatuses described herein enable a base station to transmit one or more first SSBs associated with an RIS on a beam toward the RIS at a first power. The base station may transmit a second SSB associated with direct transmission from the base station, on a same beam as the one or more first SSBs or on a beam close to the beam on which the one or more first SSBs are transmitted, at a second power that is higher than the first power. As a result, a UE that detects the second SSB (e.g., the SSB for direct transmission from the base station) and the one or more first SSBs (e.g., the SSBs associated with the RIS) may select the second SSB based at least in part on power measurements performed by the UE. Thus, the UE may avoid attempting to perform initial access using an SSB associated with the RIS before the SSB has been redirected by the RIS. This may reduce unnecessary control signaling overhead for the base station, and may reduce interference to other UEs resulting from unnecessarily redirecting signals for the UE to a region other than the region where the UE is located.

As indicated above, FIG. 5 is provided as an example. Other examples may differ from what is described with respect to FIG. 5.

Figure 6:
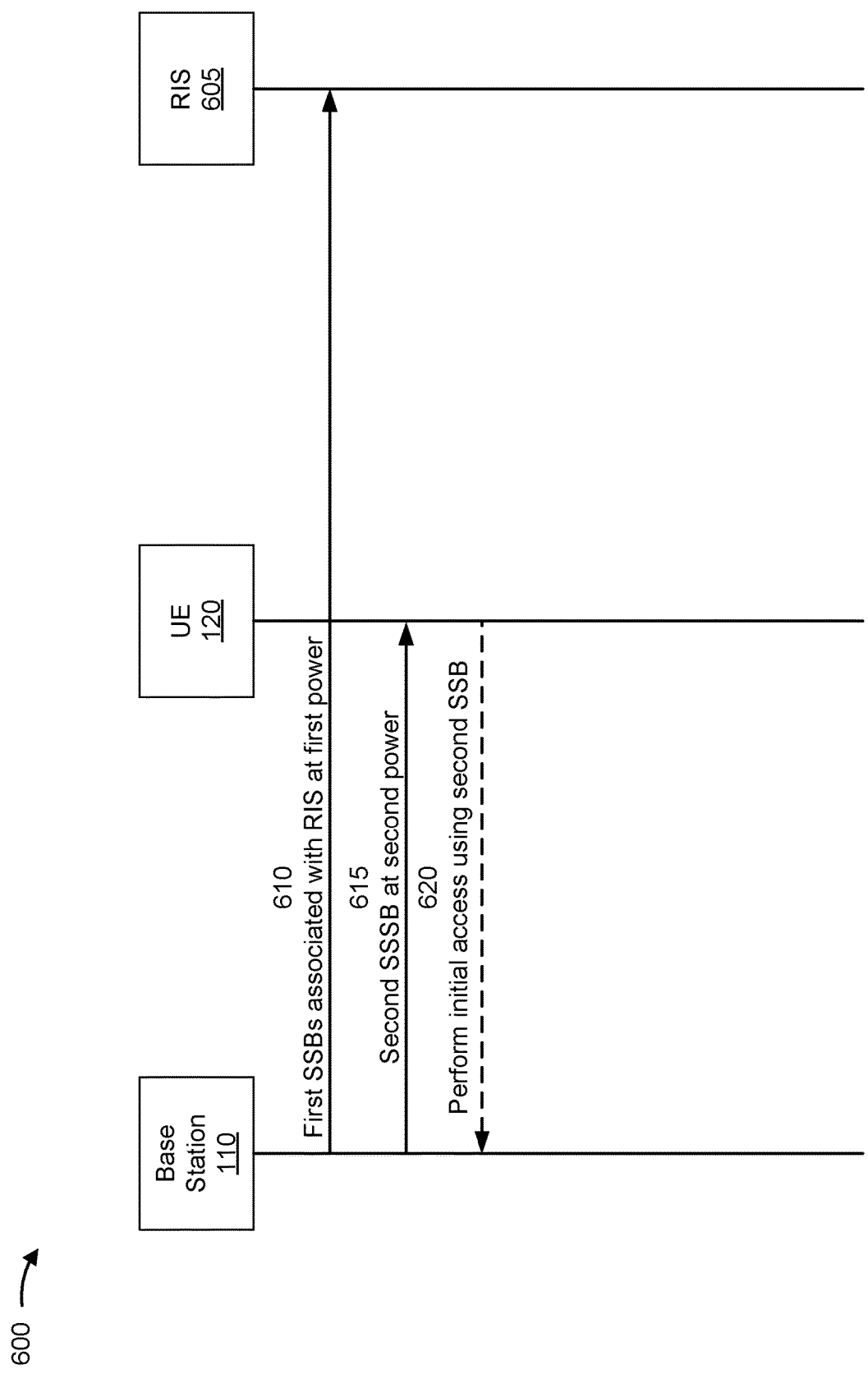
FIGS. 6-8 are diagrams illustrating examples associated with MS-assisted SSB transmission and initial access, in accordance with the present disclosure.

FIG. 6 is a diagram illustrating an example 600 associated with RIS-assisted SSB transmission and initial access, in accordance with the present disclosure. As shown in FIG. 6, example 600 includes communication between a base station 110 and a UE 120. In some aspects, the base station 110 and the UE 120 may be included in a wireless network, such as wireless network 100. As shown in FIG. 6, in some aspects, the base station 110 and the UE 120 may communicate via an RIS 605. The RIS 605 may be similar to the RIS 305 described in connection with FIGS. 3-5.

As shown in FIG. 6, and by reference number 610, the base station 110 may transmit one or more first SSBs associated with the RIS 605 at a first power. The base station 110 may transmit the first SSBs associated with the RIS 605 at the first power on a beam directed toward the RIS 605. In some aspects, the base station 110 may transmit multiple first SSBs associated with the RIS 605. The RIS 605 may receive the first SSBs transmitted by the base station 110, and the RIS 605 may redirect (or reflect) the first SSBs at different reflection angles to perform beam sweeping using the first SSBs. For example, the RIS 605 may change a reflection state of the RIS 605 for each first SSB to reflect each first SSB at a different reflection angle as compared with the other first SSBs. In some aspects, the base station 110 may transmit, to the RIS 605 (e.g., to an RIS controller of the RIS 605) an indication of a respective configuration of the reconfigurable elements of the RIS 605 for each first SSB transmitted by the base station 110. The first SSBs may be a set of SSBs dedicated for providing RIS-assisted initial access (e.g., initial access to the base station 110 through the RIS 605) to UEs in a region covered by the first SSBs redirected/reflected by the RIS 605.

As further shown in FIG. 6, and by reference number 615, the base station 110 may transmit a second SSB associated with direct transmission from the base station 110 at a second power that is higher than the first power used to transmit the first SSBs associated with the RIS 605. In some aspects, the base station 110 may transmit the second SSB associated with direct transmission from the base station 110 at the second power on the same beam (e.g., in the same beam direction) as the first SSBs associated with the RIS 605. For example, the base station 110 may transmit the second SSB in the beam direction toward the RIS 605 to provide initial access to UEs in a region between the base station 110 and the RIS 605. In some aspects, the base station 110 may transmit the second SSB associated with direct transmission from the base station 110 at the second power on a beam that is close to (e.g., within a distance threshold of) the beam on which the first SSBs are transmitted. For example, the beam on which the second SSB is transmitted may have a coverage area that at least partially overlaps with a coverage area of the beam in which the first SSBs are transmitted. The second SSB may not be redirected or reflected by the MS 605. In some aspects, unequal power between the transmission of the second SSB and the transmission of the first SSBs may cause UEs in the region between the base station 110 and the MS 605 to perform initial access using the second SSB associated with the direct transmission from the base station 110 without the UEs having to actively distinguish between the first SSBs associated with the RIS 605 and the second SSB.

The base station 110 may transmit the second SSB on the same beam as the first SSBs (or on a beam close to the beam on which the first SSBs are transmitted) at the second power that is higher than the first power used to transmit the first SSBs. In some aspects, the base station 110 may achieve the higher power (e.g., the second power) for the transmission of the second SSB by increasing the radiated power from each of one or more antenna elements of an antenna array of the base station 110, as compared with the radiated power for each antenna element when transmitting the first SSBs. For example, the base station 110 may transmit the second SSB using the increased radiated power from each antenna element of the antenna array, as compared with the radiated power used for transmitting the first SSBs, while maintaining the same beam direction as the beam direction used for transmitting the first SSBs.

In some aspects, the base station 110 may achieve the higher power (e.g., the second power) for the transmission of the second SSB by increasing a beamforming gain, as compared with a beam forming gain used when transmitting the first SSBs, while maintaining the same beam direction as the beam direction used for transmitting the first SSBs. For example, the base station 110 may transmit the second SSB using the increased beamforming gain, as compared with the beamforming gain used for transmitting the first SSBs, while maintaining the same beam direction.

In some aspects, the second SSB and the first SSBs may be part of an SSB burst set periodically transmitted by the base station 110. The SSB burst set may be partitioned into a set of SSBs associated with the RIS 605 (e.g., the first SSBs) and a set of SSBs associated with direct transmission from the base station 110. In some aspects, a cell associated with the base station 110 may include one or more other RISs, and the SSB burst set may also include a respective set of SSBs associated with each of the one or more other RISs. The second SSB may be an SSB in the set of SSBs associated with direct transmission from the base station 110. For example, the set of SSBs associated with direct transmission from the base station 110 may include multiple SSBs that are transmitted in different beam directions (e.g., on different beams), including the second SSB that is transmitted in the same beam direction as the first SSBs associated with the MS 605 (or in a beam direction close to the beam direction for the first SSBs). In some aspects, the base station 110 may transmit the second SSB at the second power based at least in part on the second SSB being transmitted in the same beam direction (e.g., on the same beam) as the first SSBs associated with the RIS 605. In some aspects, in addition to the second SSB that is transmitted in the same beam direction as the first SSBs, the base station 110 may also use the second power to transmit one or more other SSBs associated with direct transmission from the base station 110 on beams that are close (e.g., within a distance threshold) to the beam used for transmitting the first SSBs. In some aspects, the base station 110 may use the second power to transmit all of the SSBs associated with direct transmission from the base station 110, and the base station 110 may use the first power to transmit all of the SSBs (e.g., the first SSBs) associated with the RIS 605.

As further shown in FIG. 6, and by reference number 620, the UE 120 may perform initial access using the second SSB (e.g., the SSB associated with direct transmission from the base station 110). In some aspects, the UE 120 may search for one or more SSBs to perform initial access, and the UE 120 may detect and/or receive the second SSB and one or more of the first SSBs transmitted by the base station 110. For example, the UE 120 may be located in the region between the base station 110 and the RIS 605. The UE 120 may perform power measurements (e.g., RSRP measurements) for the second SSB and the one or more first SSBs detected/received by the UE 120. In some aspects, the measured RSRP for each first SSB detected by the UE 120 may be smaller than the measured RSRP for the second SSB due to the base station 110 transmitting the second SSB at the second power that is greater than the first power used to transmit the first SSBs. The UE 120, in connection with measuring the higher power (e.g., RSRP measurement) for the second SSB (as compared with the power measurements (e.g., RSRP measurements) for the first SSBs), may determine that the second SSB is more suitable than the first SSBs for initial access. The UE 120 may then use the second SSB for initial access to the base station 110 (e.g., initial access to the cell associated with the base station 110).

In some aspects, the UE 120 may use the PSS of the second SSB to determine subframe/symbol timing of the base station 110 and to determine a physical layer identity. The UE 120 may use the SSS of the second SSB to determine a physical layer cell identity group number and radio frame timing. The UE 120 may decode the PBCH of the second SSB to obtain the MIB that provides system information for initial access. The MIB may include information regarding a control resource set (CORESET) and physical downlink control channel (PDCCH) search space used to receive and decode a system information block (SIB) type 1 (SIB1). The SIB1 may include system information (e.g., RMSI) that identifies network access parameters, such as RACH resources associated with the second SSB. The UE 120 may transmit an initial access message to the base station 110 using one or more RACH resources associated with the second SSB. For example, the initial access message may be a first message (e.g., Msg 1) in a RACH procedure for initial access.

As described above, the base station 110 may transmit one or more first SSBs associated with the RIS 605 on a beam toward the RIS 605 at a first power. The base station 110 may transmit a second SSB associated with direct transmission from the base station 110, on a same beam as the one or more first SSBs or on a beam close to the beam on which the one or more first SSBs are transmitted, at a second power that is higher than the first power. As a result, the UE 120 that detects the second SSB (e.g., the SSB for direct transmission from the base station 110) and the one or more first SSBs (e.g., the SSBs associated with the RIS 605) may select the second SSB for initial access based at least in part on power measurements performed by the UE 120. Thus, the UE 120 may avoid performing initial access using an SSB associated with the RIS 605 before the SSB has been redirected by the RIS 605. This may reduce unnecessary control signaling overhead for the base station 110, and may reduce interference to other UEs resulting from unnecessarily redirecting signals for the UE 120 to a region other than the region where the UE 120 is located.

As indicated above, FIG. 6 is provided as an example. Other examples may differ from what is described with respect to FIG. 6.

Figure 7:
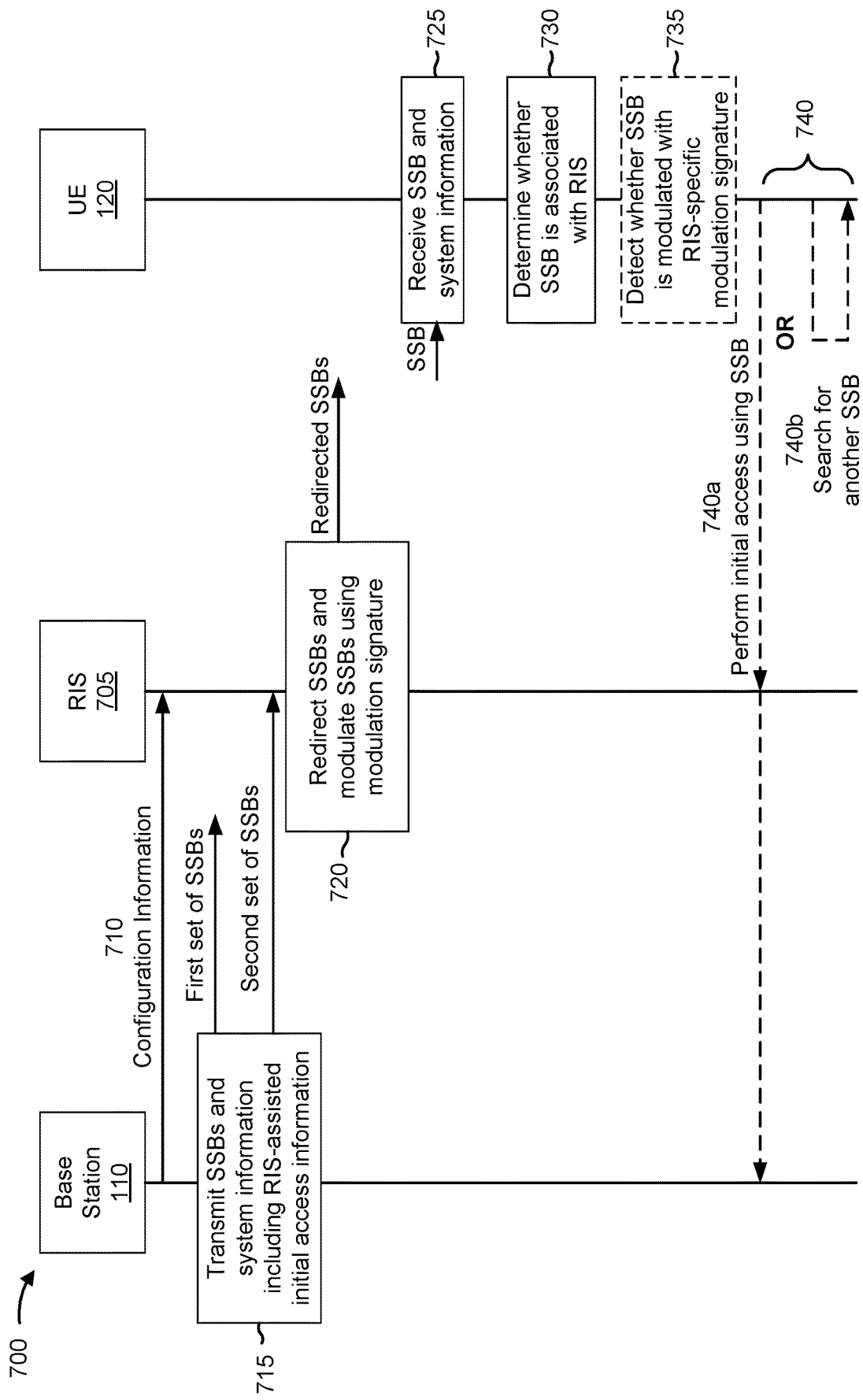

FIG. 7 is a diagram illustrating an example 700 associated with RIS-assisted SSB transmission and initial access, in accordance with the present disclosure. As shown in FIG. 7, example 700 includes communication between a base station 110 and a UE 120. In some aspects, the base station 110 and the UE 120 may be included in a wireless network, such as wireless network 100. BS 110 and UE 120 may communicate via a wireless access link, which may include an uplink and a downlink. As shown in FIG. 7, in some aspects, the base station 110 and the UE 120 may communicate via an RIS 705. The RIS 705 may be similar to the RIS 305 described in connection with FIGS. 3-5 and or the RIS 605 described in connection with FIG. 6.

As shown in FIG. 7, and by reference number 710, the base station 110 may transmit configuration information to the RIS 705. The configuration information may include an indication a modulation signature associated with the RIS 705. "Modulation signature" may refer to a pattern or sequence of modulation added to a signal that is reflected or redirected by the RIS 705. The modulation signature may also be referred to as an RIS watermark. The modulation signature may be an RIS-specific modulation signature for the RIS 705. In some aspects, in a case in which there are multiple RISs in a cell associated with the base station 110, the base station 110 may transmit, to each RIS, configuration information including an indication of a respective RIS-specific modulation signature associated with that RIS. In some aspects, the configuration information may indicate a beam state or a beam direction of the RIS 705 that is associated with the modulation signature (e.g., multiple modulation signatures may be indicated for multiple beam states and/or beam directions of the RIS 705). In some aspects, the configuration information may indicate that the RIS 705 is to modulate a signal reflected or redirected by the RIS, in accordance with the modulation signature, at symbol boundaries.

The modulation signature associated with the RIS 705 may be a phase modulation signature, a frequency modulation signature, a polarization modulation signature, and/or an amplitude modulation signature, among other examples. "Phase modulation signature" may refer to a pattern or sequence (e.g., an RIS-specific pattern or sequence) of phase changes or phase shifts, added to a signal that is reflected or redirected by the RIS 705. "Frequency modulation signature" may refer to a pattern or sequence (e.g., an RIS-specific pattern or sequence) of frequency changes or frequency shifts, added to a signal that is reflected or redirected by the RIS 705. "Polarization modulation signature" may refer to a pattern or sequence (e.g., an RIS-specific pattern or sequence) of polarization states (e.g., angle or polarization or polarization mode), added to a signal that is reflected or redirected by the RIS 705. "Amplitude modulation signature" may refer to a pattern or sequence (e.g., an RIS-specific pattern or sequence) of amplitude changes or amplitude shifts, added to a signal that is reflected or redirected by the RIS 705.

In some aspects, for a phase modulation signature, a common phase modulation may be applied (by the RIS 705) to a signal that is reflected and/or redirected by the RIS 705. "Common phase modulation" may refer to a phase modulation that is applied by all reconfigurable elements of the RIS 705. For example, the MS 705 may modulate (e.g., scramble) a signal by the phase modulation signature, and the phase modulation signature may be a time-domain phase shift pattern, specific to the MS 705, that is applied (by the MS 705) to a signal reflected or redirected by the MS 705. The time-domain phase shift pattern may include phase changes (e.g., phase shifts) that are included in a set of phase changes (e.g., a finite set of phase changes). For example, the time-domain phase shift pattern may include phase changes from a set of phase changes that includes $\pm 90°$, $\pm 45°$, and/or $\pm 30°$, among other examples. In some aspects, in order to minimize negative effects of inter-carrier interference or inter-symbol interference, the phase changes may be applied (e.g., by the RIS 705) on an OFDM symbol level (e.g., may be applied at OFDM symbol boundaries). For example, the modulation signature may modulate the signal (e.g., in phase) at each symbol of a set of symbols associated with the signal (e.g., to be redirected by the RIS 705) or at a subset of symbols of the set of symbols. In some aspects, the configuration information may indicate the set of symbols and/or the subset of symbols that are to be associated with the phase change. In some aspects, the modulation signature may apply the phase changes per sample or a per group of samples, and the configuration information may indicate the samples and/or the groups of samples that are to be associated with the phase changes.

For a frequency modulation signature, the RIS 705 may apply a frequency change to an impinging signal, in accordance with the frequency modulation signature associated with (e.g., specific to) the RIS 705. The frequency modulation signature may identify a pattern for applying a frequency shift (e.g., by a number of subcarriers) to be applied to a signal that is reflected and/or redirected by the RIS 705. For example, the frequency modulation signature may modulate the frequency at each subcarrier of a set of subcarriers associated with the signal (e.g., to be redirected by the RIS 705) or at a subset of subcarriers of the set of subcarriers. In some aspects, the configuration information may indicate the set of subcarriers and/or the subset of subcarriers that are to be associated with the frequency change, and the configuration information may indicate the size of the frequency shift (e.g., the number of subcarriers) to be applied to the set of subcarriers and/or the subset of carriers.

For a polarization modulation signature, the RIS 705 may change a polarization of an impinging signal, in accordance with the polarization modulation signature associated with (e.g., specific to) the RIS 705. For example, the polarization of the signal reflected by the RIS 705 may be modulated (e.g., scrambled) by the polarization modulation signature. For example, a signal (e.g., an SSB) transmitted by the base station 110 may be associated with a first polarization state. The RIS 705 may modify the signal, in accordance with the polarization modulation signature, from the first polarization state of the signal as transmitted by the base station 110 to a second polarization state of the signal as reflected or redirected by the RIS 705. The polarization state (e.g., the first polarization state and/or the second polarization state) may include an angle of polarization (e.g., for linear polarization) or a polarization mode (e.g., the first polarization state and the second polarization state may use different polarization modes). A polarization mode may include linear polarization, circular polarization, and/or elliptical polarization, among other examples. In some aspects, in order to minimize negative effects of inter-carrier interference or inter-symbol interference, the polarization changes may be applied (e.g., by the RIS 705) on an OFDM symbol level (e.g., may be applied at OFDM symbol boundaries). For example, the modulation signature associated with the RIS 705 may modulate the polarization of the signal at each symbol of a set of symbols associated with the signal (e.g., to be reflected by the RIS 705) or at a subset of symbols of the set of symbols. In some aspects, the configuration information may indicate the set of symbols and/or the subset of symbols that are to be associated with the polarization change.

For an amplitude modulation signature, the RIS 705 may attenuate the amplitude of the signal (e.g., to be reflected or redirected by the RIS 705) in accordance with the amplitude modulation signature associated with (e.g., specific to) the RIS 705. For example, at certain time intervals, the RIS 705 may attenuate the amplitude by turning off one or more reconfigurable elements (e.g., such that the reconfigurable elements that are turned off do not reflect or redirect the signal). For example, one or more reconfigurable elements of the RIS 705 may be tuned with a random phase to change a reflection angle (e.g., a beam direction) of the signal (e.g., the RIS 705 may point a beam direction to a null direction (e.g., toward the sky)) to increase the attenuation of the signal. In some aspects, the RIS 705 may attenuate the amplitude of the signal by puncturing (e.g., not reflecting or redirecting) the signal at certain time intervals in accordance with a pattern identified in the modulation signature associated with the RIS 705. For example, the signal may be modulated (e.g., by the RIS 705) with attenuation in the amplitude of the signal (e.g., where the amplitude is reduced) or with gaps (e.g., where the amplitude is zero) where no signal is received by the receiver. The pattern or sequence of the attenuation or the gaps identified in the amplitude modulation signature may be specific to the RIS 705.

As further shown in FIG. 7, and by reference number 715, the base station 110 may transmit SSBs in an SSB burst set and system information including RIS-assisted initial access information. In some aspects, the SSB burst set may include a first set of SSBs associated with direct transmission from the base station 110 and a second set of SSBs associated with the RIS 705. The base station 110 may perform beam sweeping with the SSBs in the first set of SSBs. For example, the base station 110 may transmit the SSBs in the first set of SSBs on different beams having different beam directions. The base station 110 may transmit the SSBs in the second set of SSBs on a beam directed toward the RIS 705. In some aspects, the second set of SSBs may include multiple SSBs associated with the RIS 705, and the base station 110 may transmit the multiple SSBs associated with the RIS 705 on the beam directed towards the RIS 705.

The second set of SSBs may be dedicated for providing RIS-assisted initial access (e.g., initial access to the base station 110 via an indirect link through the RIS 705) to UEs in a region covered by the SSBs (in the second set of SSBs) that are redirected and/or reflected by the RIS 705. The first set of SSBs may be dedicated for providing initial access to the base station 110 via a direct link with the base station 110. In some aspects, the SSBs in the first set of SSBs may not be redirected by the RIS 705. In some aspects, the base station 110 may transmit an SSB in the first set of SSBs on the same beam (e.g., in the same beam direction) as the SSBs in the second set of SSBs, or on beam that is close to the beam on which the SSBs in the second set of SSBs are transmitted (e.g., a beam that satisfies a distance threshold with respect to the beam on which the SSBs in the second set of SSBs are transmitted). For example, the base station 110 may transmit the SSB in the first set of SSBs in the beam direction toward the RIS 705 to provide initial access to UEs in a region between the base station 110 and the RIS 705.

The base station 110 may transmit the RIS-assisted initial access information in system information associated with the SSBs in the SSB burst set (e.g., the first set of SSBs and the second set of SSBs). In some aspects, the RIS-assisted initial access information may identify the set of SSBs that are associated with the RIS 705 (e.g., the second set of SSBs) and the modulation signature associated with the RIS 705. The RIS-assisted initial access information may indicate which SSBs, in the SSB burst set, are associated with the MS 705 (e.g., which SSBs are dedicated for MS-assisted initial access). For example, the MS-assisted initial access information may include an indication of SSB indices for the SSBs in the second set of SSBs (e.g., a respective SSB index for each SSB in the set of SSBs that are associated with the MS 705). In some aspects, in a case in which there are multiple RISs in the cell associated with the base station 110, the RIS-assisted initial access information may indicate the SSB indices for the SSBs in the respective set of SSBs associated with each RIS.

The RIS-assisted initial access information may also include an indication of the modulation signature associated with the RIS 705. In some aspects, the RIS-assisted initial access information may include a respective indication of the modulation signature associated with the RIS 705 for each SSB associated with the RIS 705. In a case in which the RIS 705 is configured to apply the same RIS-specific modulation signature to all signals redirected by the RIS 705, the RIS-assisted initial access information may indicate the same modulation signature (e.g., the RIS-specific modulation signature associated with the RIS 705) for each SSB in the second set of SSBs. In a case, in which the RIS 705 is configured to apply different modulation signatures (e.g., different RIS-specific modulation signatures) for different beam states/reflection directions, the RIS-assisted initial access information may indicate different modulation signatures (e.g., different modulation signatures associated with the RIS 705) for different SSBs in the second set of SSBs).

In some aspects, the system information including the RIS-assisted initial access information may be included in an MIB (e.g., in the PBCH) of an SSB. In this case, the base station 110 may transmit the system information in the MIB in each SSB in the SSB burst set (e.g., in the first set of SSBs and the second set of SSBs). In some aspects, the system information including the RIS-assisted initial access information may be included in the SDB1 associated with each SSB. In this case, for each SSB in the SSB burst set, the base station 110 may transmit the associated SIB1, including the RIS-assisted initial access information. For example, base station 110 may transmit the SDB1 associated with an SSB in the same beam direction as the SSB (and the reflection angle from the RIS 705 for an SSB in the second set of SSBs), and a UE (e.g., UE 120) may determine the timing of the SIB1 transmission and parameters to decode the SIB1 transmission from the MIB included in the SSB. In some aspects, the MS-assisted initial access information may be included in system information in another SIB. In this case, the base station 110 may transmit the SIB including the RIS-assisted initial access information periodically or in connection with a request from a UE (e.g., UE 120) for the SIB including the MS-assisted initial access information.

As further shown in FIG. 7, and by reference number 720, the MS 705 may redirect (or reflect) the SSBs in the second set of SSBs using the modulation signature associated with the MS 705 (e.g., the RIS-specific modulation signature), resulting in redirected SSBs that are modulated with the modulation signature associated with the RIS 705. The RIS 705 may receive the SSBs in the second set of SSBs transmitted by the base station 110, and the RIS 705 may redirect (or reflect) the SSBs in the second set of SSBs at different reflection angles to perform beam sweeping using the SSBs. For example, the RIS 705 may change a reflection state (e.g., beam state) of the RIS 705 for each SSB in the second set of SSBs to redirect each SSB at a different reflection angle.

In some aspects, the base station 110 may control the RIS 705 to redirect each SSB in the second set of SSBs. For example, the base station 110 may transmit, to the RIS 705 (e.g., to an RIS controller of the RIS 705), a respective RIS control signal indicating a configuration of the reconfigurable elements of the RIS 705 for redirecting each SSB in the second set of SSBs transmitted by the base station 110. In some aspects, the base station 110 may also control the RIS 705 (e.g., via the RIS control signals) to modulate each SSB in the second set of SSBs by the modulation signature associated with the RIS 705 (e.g., the RIS-specific modulation signature).

The RIS 705 may modulate each SSB redirected by the RIS 705 (e.g., each SSB in the second set of SSBs) using the modulation signature associated with the RIS 705. For example, for each SSB redirected by the RIS 705, the RIS 705 may modulate the SSB (e.g., the SSB signal) in phase (e.g., in accordance with a phase modulation signature), may modulate a frequency of the SSB signal (e.g., in accordance with a frequency modulation signature), may modulate a polarization of the SSB signal (e.g., in accordance with a polarization modulation signature), and/or may modulate an amplitude of the SSB signal (e.g., in accordance with an amplitude modulation signature). For example, the RIS 705 may modulate (e.g., scramble) at least one of the phase, the amplitude, the frequency, or the polarization of the SSB signal (for each SSB redirected by the RIS 705) at the symbol boundaries of the SSB signal, in accordance with an RIS-specific pattern or sequence of modulation identified in the modulation signature associated with the RIS 705.

In some aspects, the MS 705 may be configured with different modulation signatures for different beam states (e.g., reflection directions). In this case, the SSBs redirected by the MS 705 at different reflection directions (e.g., using different beam states) may be modulated using different modulations signatures. For example, the MS 705 may modulate each SSB redirected by the MS 705 (e.g., each SSB in the second set of SSBs) at a different respective modulation signature associated with the beam state for redirecting that SSB.

As further shown in FIG. 7, and by reference number 725, the UE 120 may receive an SSB and system information associated with the SSB. The UE 120 may search for an SSB suitable for initial access. For example, the UE 120 may detect and/or receive one or more SSBs (e.g., one or more SSBs from the first set of SSBs and/or one or more SSBs from the second set of SSBs) and perform power measurements (e.g., RSRP measurements) for an initial determination of whether a receive SSB is suitable for initial access. The UE 120, in connection with receiving an SSB (e.g., an SSB that is suitable for initial access based at least in part on the power measurements), may receive the system information that includes the RIS-assisted initial access information. In some aspects, the UE 120 may receive the system information that includes the RIS-assisted initial access information in an MIB of the SSB (e.g., the MIB included in the PBCH of the SSB). In some aspects, based at least in part on the system information in the MIB, the UE 120 may receive, from the base station 110, an SIB1 associated with the SSB, and the SIB1 may include the system information including the RIS-assisted initial access information. In some aspects, the UE 120 may receive the system information including the RIS-assisted initial access information from the base station 110 in another SIB associated the SSB. In this case, the UE 120 may transmit, to the base station 110, a request for the SIB including the RIS-assisted initial access information, and the UE 120 may receive the SIB including the RIS-assisted initial access information from the base station 110 based at least in part on the request for the SIB.

As shown by reference number 730, the UE 120 may determine whether the SSB is associated with the RIS 705 (or any other RIS) based at least in part on the RIS-assisted initial access information. The RIS-assisted initial access information may indicate SSB indices of SSBs that are associated with the RIS 705 (e.g., SSBs in the second set of SSBs). The UE 120 may determine whether the SSB received by the UE 120 is associated with the RIS 705 based at least in part on a comparison of the SSB index of the SSB and the indication, in the RIS-assisted initial access information, of the SSB indices of the SSBs that are associated with the RIS 705.

As shown by reference number 735, in some aspects, in connection with a determination that the SSB is associated with the MS 705 (e.g., the SSB is in the second set of SSBs associated with the MS 705), the UE 120 may detect whether the SSB is modulated with the modulation signature associated with the RIS 705 (e.g., the RIS-specific modulation signature for the RIS 705). In some aspects, in a case in which the SSB is associated with the RIS 705, the UE 120 may detect a modulation signature of the SSB. The UE 120 may demodulate and/or decode the SSB (e.g., when the SSB is received by the UE 120) to identify a modulation signal used to modulate the SSB. For example, the UE 120 may detect phase changes, frequency changes, polarization changes, and/or amplitude changes in the SSB. The UE 120 may detect the modulation pattern of the SSB by detecting a pattern or a sequence for the phase changes, frequency changes, polarization changes, and/or amplitude changes. In connection with detecting the modulation signature of the SSB, the UE 120 may compare the detected modulation signature of the SSB with the modulation signature associated with the RIS 705 that is indicated in the RIS-assisted initial access information to determine whether the SSB is modulated with the modulation signature associated with the RIS 705. For example, the UE 120 may determine that the SSB is modulated with the modulation signature associated with the RIS 705 based at least in part on determining that a detected pattern or sequence of phase changes, frequency changes, polarization changes, and/or amplitude changes in the SSB corresponds to the modulation signature associated with the RIS 705. In this case, the UE 120 may identify that the SSB was redirected by the RIS 705.

In some aspects, the UE 120 may determine that the SSB is not modulated with the modulation signature associated with the RIS 705. For example, the UE 120 may detect that the SSB is not modulated with a modulation signature or that the SSB is modulated with a modulation signature that is different from the modulation signature associated with the RIS 705. In this case, the UE 120 may identify that the SSB was not redirected by the RIS 705 before the UE 120 received the SSB.

As further shown in FIG. 7, and by reference number 740, the UE 120 may selectively perform initial access using the SSB or search for another SSB for initial access. In some aspects, the UE 120 may select whether to perform initial access using the SSB or to search for another SSB based at least in part on the RIS-assisted initial access information. For example, the UE 120 may select whether to perform initial access using the SSB or search for another SSB based at least in part on the determination of whether the SSB is associated with the MS 705 and/or based at least in part on detecting whether the SSB is modulated with the modulation signature associated with the MS 705.

As shown by reference number 740a, in some aspects the UE 120 may perform initial access using the SSB. In some aspects, the UE 120 may select to perform initial access using the SSB based at least in part on a determination that the SSB is not associated with the RIS 705 (or any other RIS). In this case, the SSB may be an SSB associated with direct transmission from the base station 110 (e.g., an SSB in the first set of SSBs), and the UE 120 may be in a region in which the UE 120 can perform initial access directly with the base station 110 (e.g., without using RIS-assisted initial access).

In some aspects, in connection with a determination that the SSB is associated with the RIS 705 (e.g., the SSB is in the second set of SSBs), the UE 120 may select to perform the initial access using the SSB based at least in part on detecting that the SSB is modulated with the modulation signature associated with the RIS 705 (e.g., the RIS-specific modulation signature). In this case, the UE 120 may identify that the SSB associated with the RIS 705 was redirected by the RIS 705, and the UE 120 may be in a region covered by the SSBs associated with the RIS 705 (e.g., the second set of SSBs).

In some aspects, to perform initial access using the SSB, the UE 120 may transmit, to the base station 110, an initial access message in a RACH resource associated with the SSB. For example, the RACH resource associated with the SSB may be identified in the system information (e.g., in the SIB1) associated with the SSB. The initial access message may be a first message (e.g., Msg 1) in a RACH procedure for initial access to the cell associated with the base station 110. In some aspects, in the case in which the SSB is associated with direct transmission from the base station 110 (e.g., the SSB is in the first set of SSBs), the UE 120 may transmit the initial access message directly to the base station 110.

In some aspects, in the case in which the SSB is associated with the RIS 705 (e.g., the SSB is in the second set of SSBs) and the SSB has been redirected by the RIS 705, the UE 120 may perform RIS-assisted initial access and transmit the initial access message to the base station 110 via an indirect link through the RIS 705. For example, the UE 120 may transmit the initial access message to the MS 705, the MS 705 may receive the initial access message, and the RIS 705 may redirect the initial access message at a reflection angle toward the base station 110. In this case, the UE 120 and the base station 110 may communicate (e.g., during the RACH procedure) via the indirect link through the MS 705.

As shown by reference number 740b, in some aspects, the UE 120 may search for another SSB. In some aspects, in connection with a determination that the SSB is associated with the RIS 705 (e.g., the SSB is in the second set of SSBs), the UE 120 may select to search for another SSB for initial access based at least in part on detecting that the SSB is not modulated with the modulation signature associated with the RIS 705 (e.g., the RIS-specific modulation signature). In this case, the UE 120 may identify that the SSB was not redirected by the RIS 705 before the UE 120 received the SSB. For example, the UE 120 may be in a region between the base station 110 and the RIS 705, and the UE 120 may have received an SSB that is dedicated for RIS-assisted initial access.

In some aspects, the base station 110 may transmit the SSBs associated with the RIS 705 at a first power, and the base station 110 may transmit an SSB associated with direct transmission from the base station 110, on the same beam as the SSBs associated with the RIS 705 or on a beam close to (e.g., within a distance threshold of) the beam in which the SSBs associated with the RIS 705 are transmitted, at a second power that is higher than the first power, as described above in connection with FIG. 6. For example, in some aspects, the base station 110 may use the unequal transmission powers for the SSBs associated with the RIS 705 and the SSB associated with direct transmission from the base station 110 in combination with the techniques described above in connection with FIG. 6. As a result, a UE that is not capable of detecting the modulation signature may still be able to avoid performing initial access using an SSB associated with the RIS 705 before the SSB has been redirected by the RIS 705.

As described above, the base station 110 may transmit an SSB burst set including a first set of SSBs associated with direct transmission from the base station 110 and a second set of SSBs associated with an RIS 705. The base station 110 may transmit system information including RIS-assisted initial access information that identifies the second set of SSBs and a modulation signature associated with the RIS 705. In some aspects, the UE 120 may receive an SSB block transmitted by the base station 110, and the UE 120 may receive the system information that includes the RIS-assisted initial access information that identifies the second set of SSBs and the modulation signature associated with the RIS 705. The UE 120 may selectively perform initial access using the SSB or search for another SSB based at least in part on the RIS-assisted initial access information. As a result, the UE 120 may avoid performing initial access using an SSB associated with the MS 705 before the SSB has been redirected by the RIS 705. This may reduce unnecessary control signaling overhead for the base station 110, and may reduce interference to other UEs resulting from unnecessarily redirecting signals for the UE 120 to a region other than the region where the UE 120 is located.

As indicated above, FIG. 7 is provided as an example. Other examples may differ from what is described with respect to FIG. 7.

Figure 8:
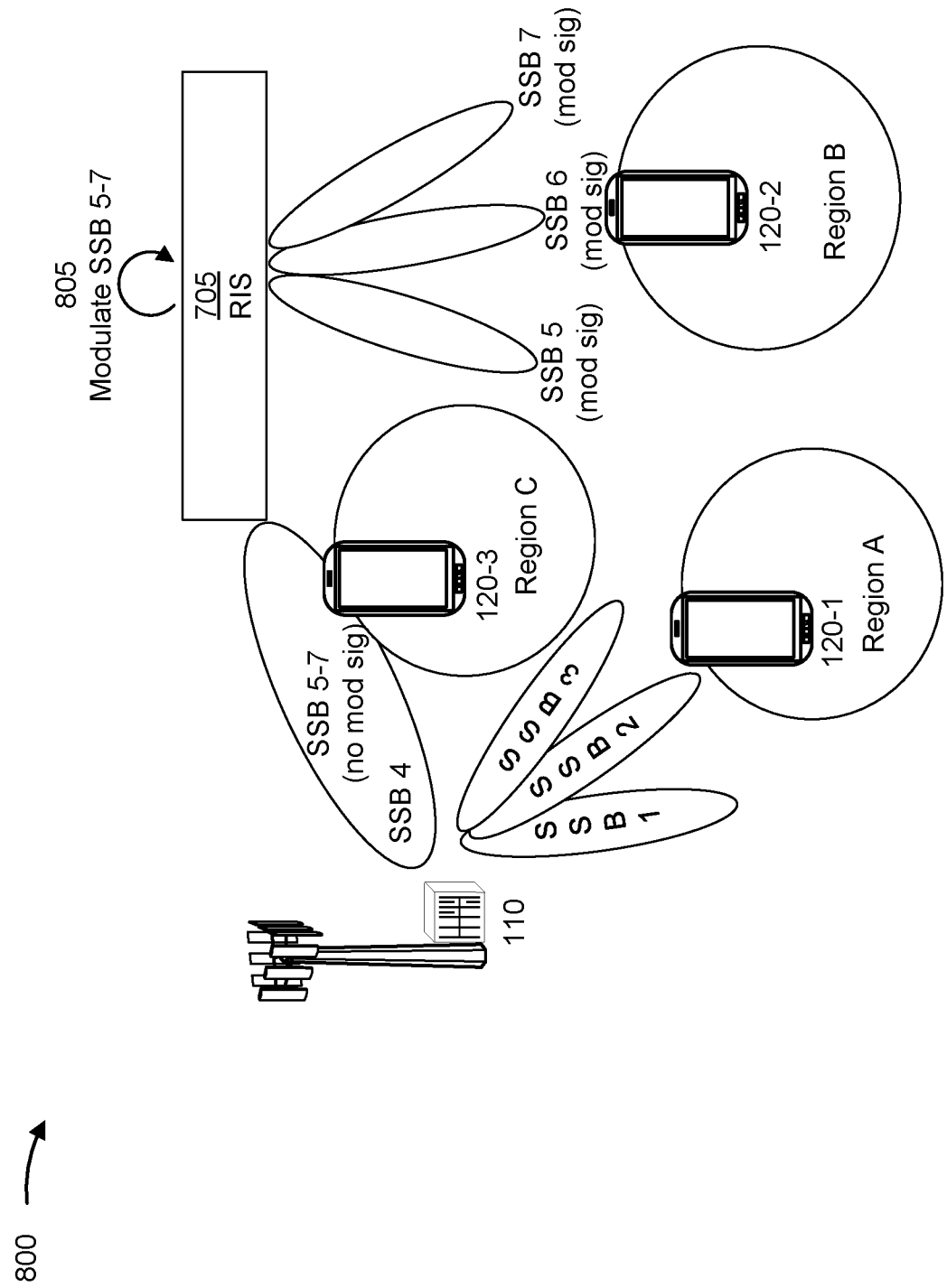

FIG. 8 is a diagram illustrating an example 800 associated with RIS-assisted SSB transmission and initial access, in accordance with the present disclosure. As shown in FIG. 8, example 800 includes a base station 110, a first UE 120-1, a second UE 120-2, a third UE 120-3, and an RIS 705.

As shown in FIG. 8, the base station 110 may transmit an SSB burst that includes a first set of SSBs (e.g., SSB 1, SSB 2, SSB 3, and SSB 4) that are associated with direct transmission from the base station 110 and a second set of SSBs (e.g., SSB 5, SSB, 6, and SSB 7) that are associated with the RIS 705. The base station 110 may transmit SSB 1, SSB 2, SSB 3, and SSB 4 on different beams having different beam directions. The base station 110 may transmit SSB 5, SSB 6, and SSB 7 on a beam directed toward the RIS 705, and the RIS 705 may redirect SSB 5, SSB 6, and SSB 7 at different reflection angles associated with different reflection states of the RIS 705. As shown by reference number 805, the RIS 705 may modulate each of SSB 5, SSB 6, and SSB 7 using a modulation signature associated with the RIS 705 (e.g., an RIS-specific modulation signature), such that the modulation signature associated with the RIS 705 is applied to each of the SSBs (e.g., SSB 5, SSB 6, and SSB 7) after being redirected by the RIS 705.

As shown in FIG. 8, SSB 1, SSB 2, and SSB 3 may be used to serve UEs in region A (e.g., the first UE 120-1). In some aspects, the first UE 120-1 may detect/receive one of the SSBs (e.g., SSB 1, SSB 2, or SSB 3) serving region A. For example, the first UE 120-1 may detect/receive SSB 2. In this case, the first UE 120-1 may receive, from the base station 110, system information associated with SSB 2 (e.g., in the MIB, the SIB1, or another SIB), and the system information may include RIS-assisted initial access information that identifies the SSBs associated with the RIS 705 (e.g., SSB 5, SSB 6, and SSB 7) and the modulation signature associated with the RIS 705. The first UE 120-1, based at least in part on the RIS-assisted initial access information, may determine that SSB 2 is not associated with the RIS 705. The first UE 120-1, in connection with determining that SSB 2 is not associated with the RIS 705, may perform initial access using SSB 2. For example, the first UE 120-1 may transmit an initial access message to the base station 110 using a RACH resource associated with SSB 2.

SSB 4 may be used to serve UEs in region C (e.g., the third UE 120-3). SSB 5, SSB 6, and SSB 7 may be used to serve UEs 120 in region B (e.g., second UE 120-2) through the RIS 705. As shown in FIG. 8, the base station 110 may transmit SSB 4, which is associated with direct transmission from the base station 110, on a same beam as SSB 5, SSB 6, and SSB 7, which are associated with the RIS 705, or on a beam close to the beam on which SSB 5, SSB 6, and SSB 7 are transmitted. The third UE 120-3 in region C may observe or detect any (or all) of SSBs 4-7. In some aspects, the third UE 120-3 may detect/receive SSB 5, which is associated with the RIS 705 and intended to serve region B, not region C. The third UE 120-3 may receive, from the base station 110, system information associated with SSB 5 (e.g., in the MIB, SIB1, or another SIB), and the system information may include MS-assisted initial access information that identifies the SSBs associated with the RIS 705 (e.g., SSB 5, SSB 6, and SSB 7) and the modulation signature associated with the RIS 705. The third UE 120-3, based at least in part on the RIS-assisted initial access information, may determine that SSB 5 is associated with the RIS 705. In connection with determining that SSB 5 is associated with the RIS 705, the third UE 120-3 may detect whether SSB 5 is modulated with the modulation signature associated with the RIS 705. As shown in FIG. 8, SSB 5 is not modulated with the modulation signature associated with the RIS 705 when SSB 5 is detected/received by the third UE 120-3 in region C. The third UE 120-3, based at least in part on detecting that SSB 5 is not modulated with the modulation signature associated with the RIS 705, may search for another SSB to perform initial access.

In some aspects, the third UE 120-3 may detect/receive SSB 4, which is associated with direct transmission from the base station 110 and intended to serve region C. The third UE 120-3 may receive, from the base station 110, system information associated with SSB 4 (e.g., in the MIB, SIB1, or another SIB), and the system information may include MS-assisted initial access information that identifies the SSBs associated with the MS 705 (e.g., SSB 5, SSB 6, and SSB 7) and the modulation signature associated with the MS 705. The third UE 120-3, based at least in part on the RIS-assisted initial access information, may determine that SSB 4 is not associated with the MS 705. The third UE 120-3, in connection with determining that SSB 4 is not associated with the RIS 705, may perform initial access using SSB 4. For example, the third UE 120-3 may transmit an initial access message to the base station 110 using a RACH resource associated with SSB 4.

In some aspects, the second UE 120-2 may detect/receive one of the SSBs (e.g., SSB 5, SSB 6, or SSB 7) serving region B. For example, the second UE 120-2 may detect/receive SSB 6. In this case, the UE 120 may receive, from the base station 110 (e.g., via the RIS 705), system information associated with SSB 6 (e.g., in the MIB, the SIB1, or another SIB), and the system information may include RIS-assisted initial access information that identifies the SSBs associated with the MS 705 (e.g., SSB 5, SSB 6, and SSB 7) and the modulation signature associated with the RIS 705. The second UE 120-2, based at least in part on the MS-assisted initial access information, may determine that SSB 6 is associated with the MS 705. In connection with determining that SSB 6 is associated with the RIS 705, the second UE 120-2 may detect whether SSB 6 is modulated with the modulation signature associated with the MS 705. As shown in FIG. 8, SSB 6 is modulated with the modulation signature associated with the MS 705 when SSB 6 is detected/received by the second UE 120-2 in region B. The second UE 120-2, based at least in part on detecting that SSB 6 is modulated with the modulation signature associated with the RIS 705, may perform initial access (e.g., MS-assisted initial access) using SSB 6. For example, the second UE 120-2 may transmit an initial access message to the base station 110, via an indirect link through the MS 705, using a RACH resource associated with SSB 6.

As indicated above, FIG. 8 is provided as an example. Other examples may differ from what is described with respect to FIG. 8.

Figure 9:
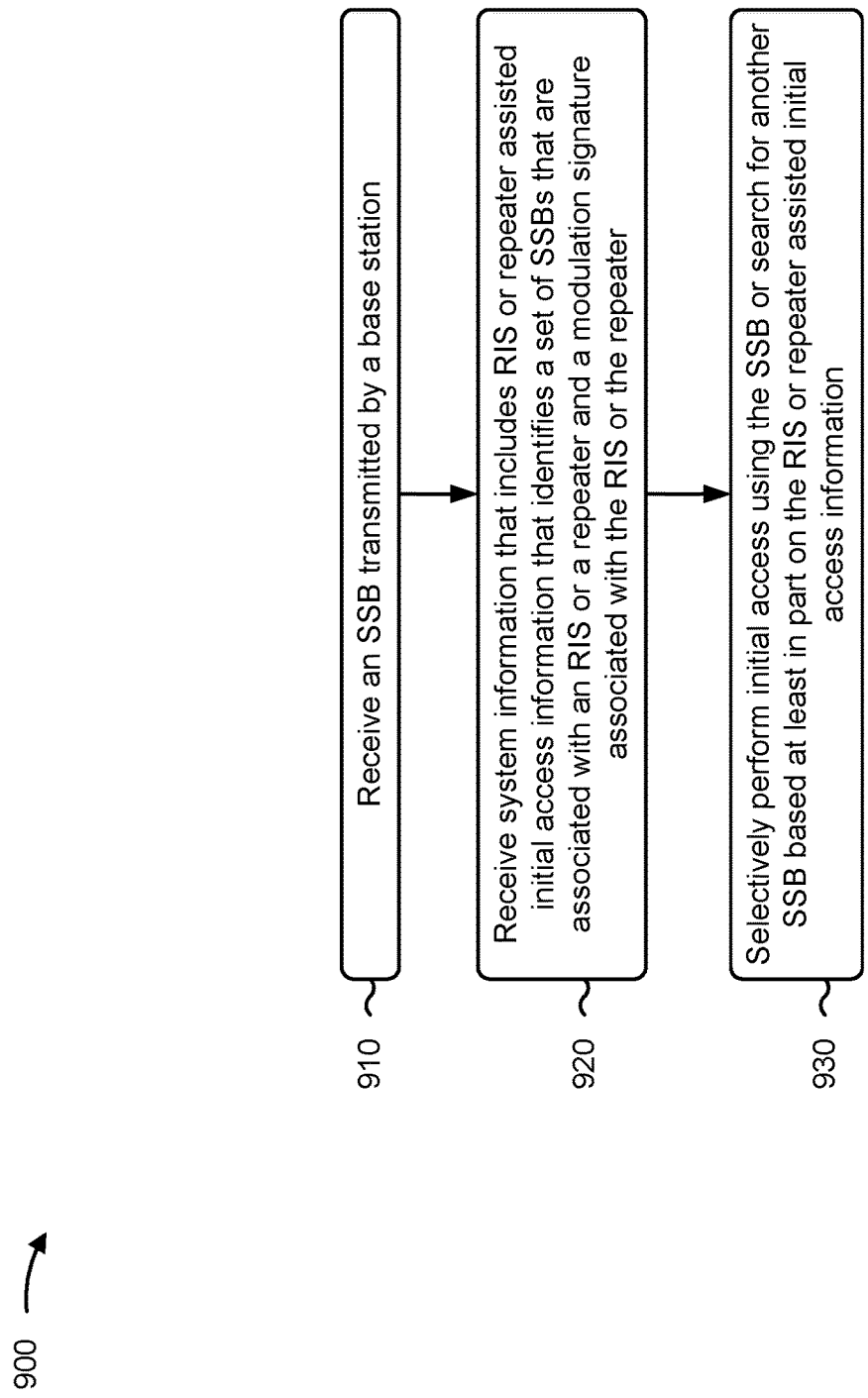
FIGS. 9-12 are diagrams illustrating example processes associated with RIS-assisted SSB transmission and initial access, in accordance with the present disclosure.

FIG. 9 is a diagram illustrating an example process 900 performed, for example, by a UE, in accordance with the present disclosure. Example process 900 is an example where the UE (e.g., UE 120) performs operations associated with RIS-assisted SSB transmission and initial access.

As shown in FIG. 9, in some aspects, process 900 may include receiving an SSB transmitted by a base station (block 910). For example, the UE (e.g., using communication manager 140 and/or reception component 1302, depicted in FIG. 13) may receive an SSB transmitted by a base station, as described above.

As further shown in FIG. 9, in some aspects, process 900 may include receiving system information that includes RIS or repeater assisted initial access information that identifies a set of SSBs that are associated with an MS or a repeater and a modulation signature associated with the MS or the repeater (block 920). For example, the UE (e.g., using communication manager 140 and/or reception component 1302, depicted in FIG. 13) may receive system information that includes RIS or repeater assisted initial access information that identifies a set of SSBs that are associated with an RIS or a repeater and a modulation signature associated with the RIS or the repeater, as described above.

As further shown in FIG. 9, in some aspects, process 900 may include selectively performing initial access using the SSB or searching for another SSB based at least in part on the RIS or repeater assisted initial access information (block 930). For example, the UE (e.g., using communication manager 140 and/or selection component 1308, depicted in FIG. 13) may selectively perform initial access using the SSB or search for another SSB based at least in part on the RIS or repeater assisted initial access information, as described above.

Process 900 may include additional aspects, such as any single aspect or any combination of aspects described below and/or in connection with one or more other processes described elsewhere herein.

In a first aspect, process 900 includes detecting, in connection with a determination that the SSB is in the set of SSBs that are associated with the RIS or the repeater, whether the SSB is modulated with the modulation signature associated with the RIS or the repeater.

In a second aspect, alone or in combination with the first aspect, selectively performing initial access using the SSB or searching for another SSB includes performing initial access using the SSB based at least in part on detecting that the SSB is modulated with the modulation signature associated with the RIS or the repeater, or searching for another SSB to use to perform initial access based at least in part on detecting that the SSB is not modulated with the modulation signature associated with the RIS or the repeater.

In a third aspect, alone or in combination with one or more of the first and second aspects, performing initial access includes performing RIS-assisted initial access using the SSB based at least in part on detecting that the SSB is modulated with the modulation signature associated with the MS or the repeater.

In a fourth aspect, alone or in combination with one or more of the first through third aspects, the modulation signature associated with the MS or the repeater modulates at least one of a phase, an amplitude, a frequency, or a polarization at symbol boundaries of a signal redirected from the MS or the repeater.

In a fifth aspect, alone or in combination with one or more of the first through fourth aspects, the RIS or repeater assisted initial access information indicates respective SSB indices for one or more SSBs in the set of SSBs that are associated with the RIS or the repeater.

In a sixth aspect, alone or in combination with one or more of the first through fifth aspects, selectively performing initial access using the SSB or searching for another SSB includes performing initial access using the SSB based at least in part on a determination that the SSB is not included in the set of SSBs associated with the RIS or the repeater.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
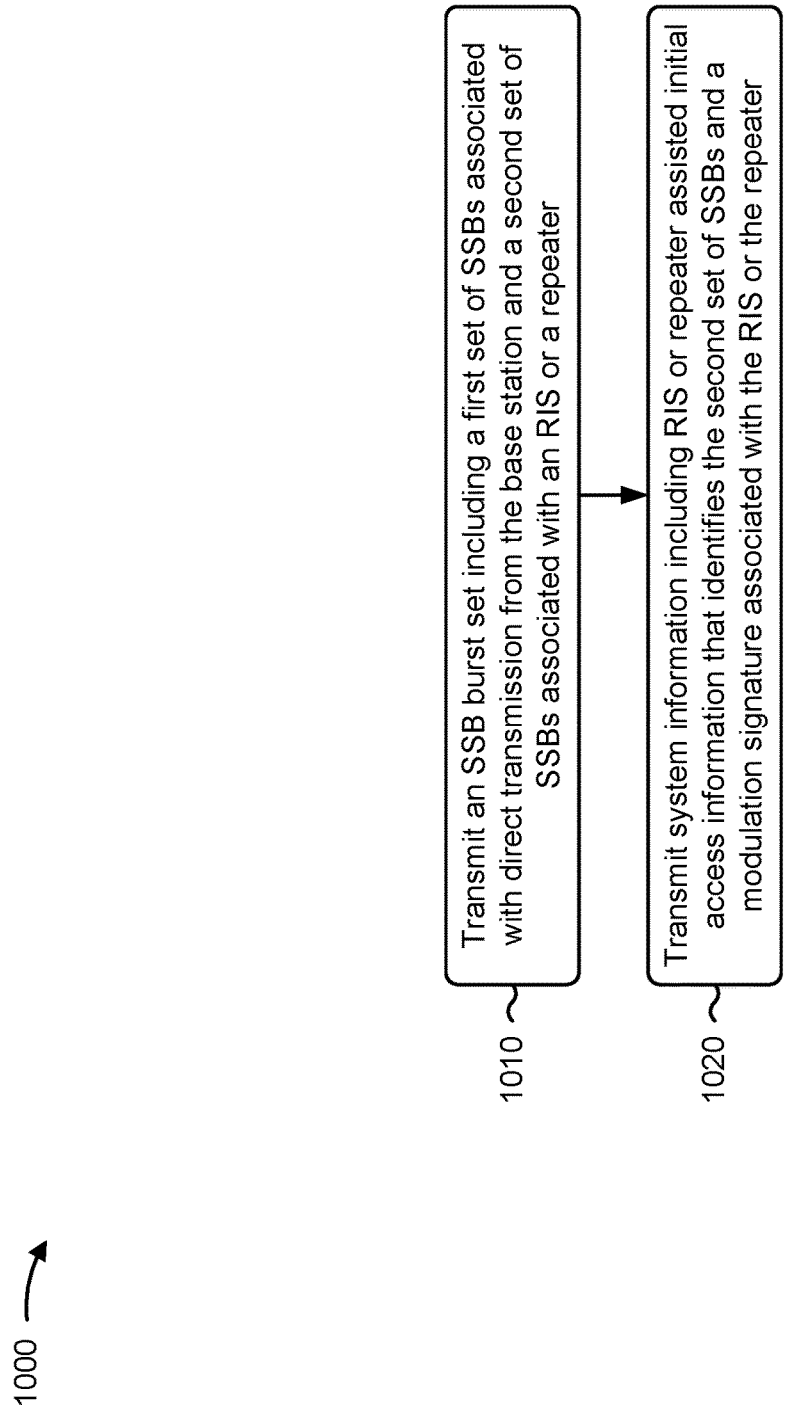

FIG. 10 is a diagram illustrating an example process 1000 performed, for example, by a base station, in accordance with the present disclosure. Example process 1000 is an example where the base station (e.g., base station 110) performs operations associated with RIS-assisted SSB transmission and initial access.

As shown in FIG. 10, in some aspects, process 1000 may include transmitting an SSB burst set including a first set of SSBs associated with direct transmission from the base station and a second set of SSBs associated with an RIS or a repeater (block 1010). For example, the base station (e.g., using communication manager 150 and/or transmission component 1404, depicted in FIG. 14) may transmit an SSB burst set including a first set of SSBs associated with direct transmission from the base station and a second set of SSBs associated with an RIS or a repeater, as described above.

As further shown in FIG. 10, in some aspects, process 1000 may include transmitting system information including RIS or repeater assisted initial access information that identifies the second set of SSBs and a modulation signature associated with the RIS or the repeater (block 1020). For example, the base station (e.g., using communication manager 150 and/or transmission component 1404, depicted in FIG. 14) may transmit system information including RIS or repeater assisted initial access information that identifies the second set of SSBs and a modulation signature associated with the RIS or the repeater, as described above.

Process 1000 may include additional aspects, such as any single aspect or any combination of aspects described below and/or in connection with one or more other processes described elsewhere herein.

In a first aspect, the modulation signature associated with the RIS or the repeater modulates at least one of a phase, an amplitude, a frequency, or a polarization at symbol boundaries of a signal redirected from the RIS or the repeater.

In a second aspect, alone or in combination with the first aspect, transmitting the SSB burst set includes transmitting the second set of SSBs on a first beam toward the RIS or the repeater, and each SSB in the second set of SSBs is to be redirected by the RIS or the repeater and modulated by the RIS or repeater by the modulation signature associated with the RIS or the repeater.

In a third aspect, alone or in combination with one or more of the first and second aspects, process 1000 includes controlling the RIS or the repeater to redirect each SSB in the second set of SSBs and to modulate each SSB in the second set of SSBs by the modulation signature associated with the RIS or the repeater.

In a fourth aspect, alone or in combination with one or more of the first through third aspects, transmitting the SSB burst set further includes transmitting an SSB in the first set of SSBs on the first beam or on a second beam that satisfies a distance threshold with respect to the first beam.

In a fifth aspect, alone or in combination with one or more of the first through fourth aspects, transmitting the second set of SSBs on the first beam includes transmitting the second set of SSBs on the first beam at a first power, and transmitting the SSB in the first SSB burst set on the first beam or on the second beam that satisfies the distance threshold with respect to the first beam includes transmitting the SSB in the first SSB burst set on the first beam or on the second beam at a second power that is higher than the first power.

In a sixth aspect, alone or in combination with one or more of the first through fifth aspects, transmitting the SSB in the first SSB burst set on the first beam or on the second beam at the second power includes transmitting the SSB in the first SSB burst set on the first beam or on the second beam using an increased radiated power from each antenna element of one or more antenna elements of an antenna array of the base station, as compared with the radiated power used for transmitting the second set of SSBs on the first beam.

In a seventh aspect, alone or in combination with one or more of the first through sixth aspects, transmitting the SSB in the first SSB burst set on the first beam or on the second beam at the second power includes transmitting the SSB in the first SSB burst set on the first beam or on the second beam using an increased beamforming gain, as compared with a beamforming gain used for transmitting the second set of SSBs on the first beam, while maintaining a same beam direction.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
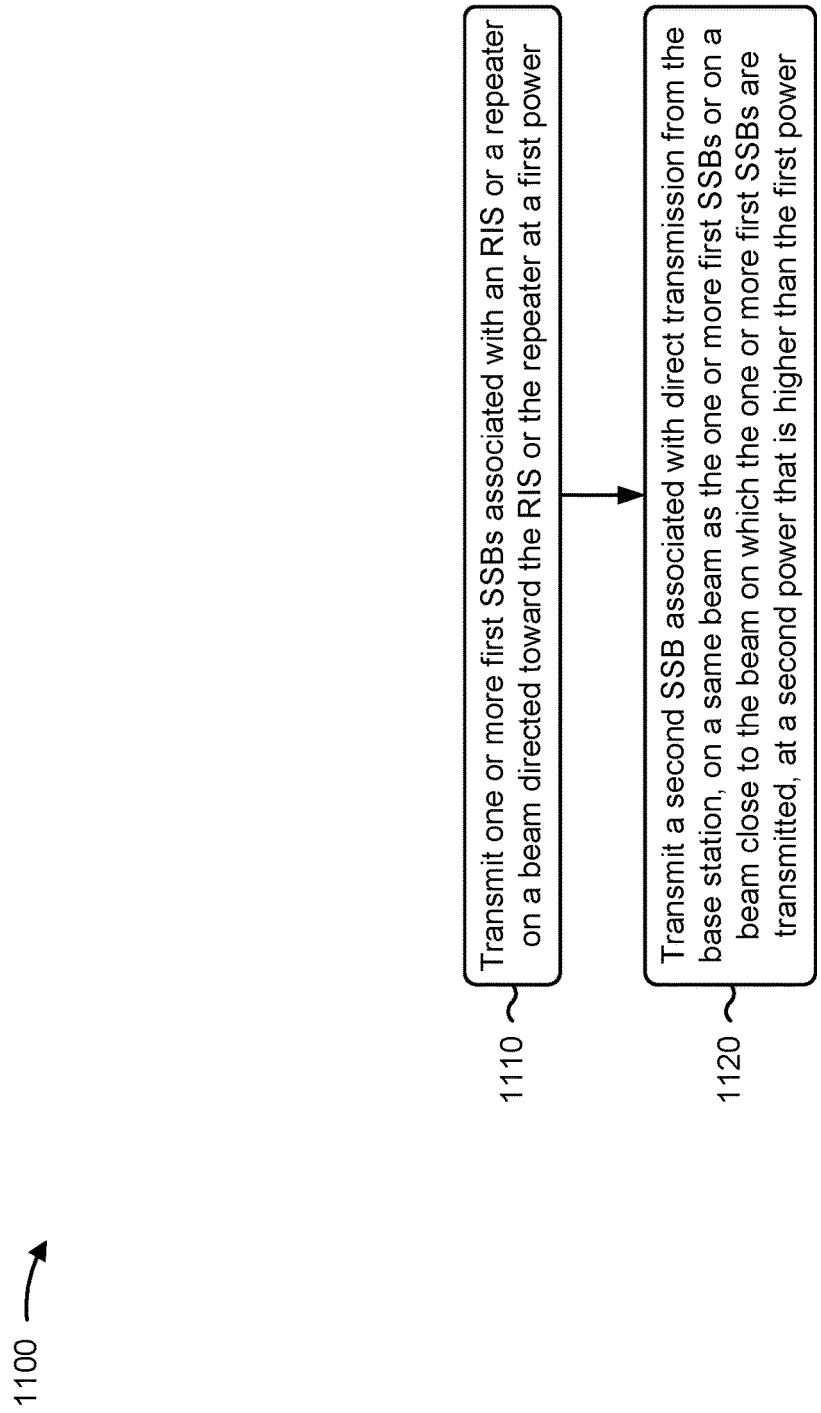

FIG. 11 is a diagram illustrating an example process 1100 performed, for example, by a base station, in accordance with the present disclosure. Example process 1100 is an example where the base station (e.g., base station 110) performs operations associated with RIS-assisted SSB transmission and initial access.

As shown in FIG. 11, in some aspects, process 1100 may include transmitting one or more first SSBs associated with an RIS or a repeater on a beam directed toward the RIS or the repeater at a first power (block 1110). For example, the base station (e.g., using communication manager 150 and/or transmission component 1404, depicted in FIG. 14) may transmit one or more first SSBs associated with an RIS or a repeater on a beam directed toward the RIS or the repeater at a first power, as described above.

As further shown in FIG. 11, in some aspects, process 1100 may include transmitting a second SSB associated with direct transmission from the base station, on a same beam as the one or more first SSBs or on a beam close to the beam on which the one or more first SSBs are transmitted, at a second power that is higher than the first power (block 1120). For example, the base station (e.g., using communication manager 150 and/or transmission component 1404, depicted in FIG. 14) may transmit a second SSB associated with direct transmission from the base station, on a same beam as the one or more first SSBs or on a beam close to the beam on which the one or more first SSBs are transmitted, at a second power that is higher than the first power, as described above.

Process 1100 may include additional aspects, such as any single aspect or any combination of aspects described below and/or in connection with one or more other processes described elsewhere herein.

In a first aspect, transmitting the second SSB at the second power includes transmitting the second SSB using an increased radiated power from each antenna element of one or more antenna elements of an antenna array of the base station, as compared with the radiated power used for transmitting the one or more first SSBs.

In a second aspect, alone or in combination with the first aspect, transmitting the second SSB at the second power includes transmitting the second SSB using an increased beamforming gain, as compared with a beamforming gain used for transmitting the one or more first SSBs, while maintaining a same beam direction.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
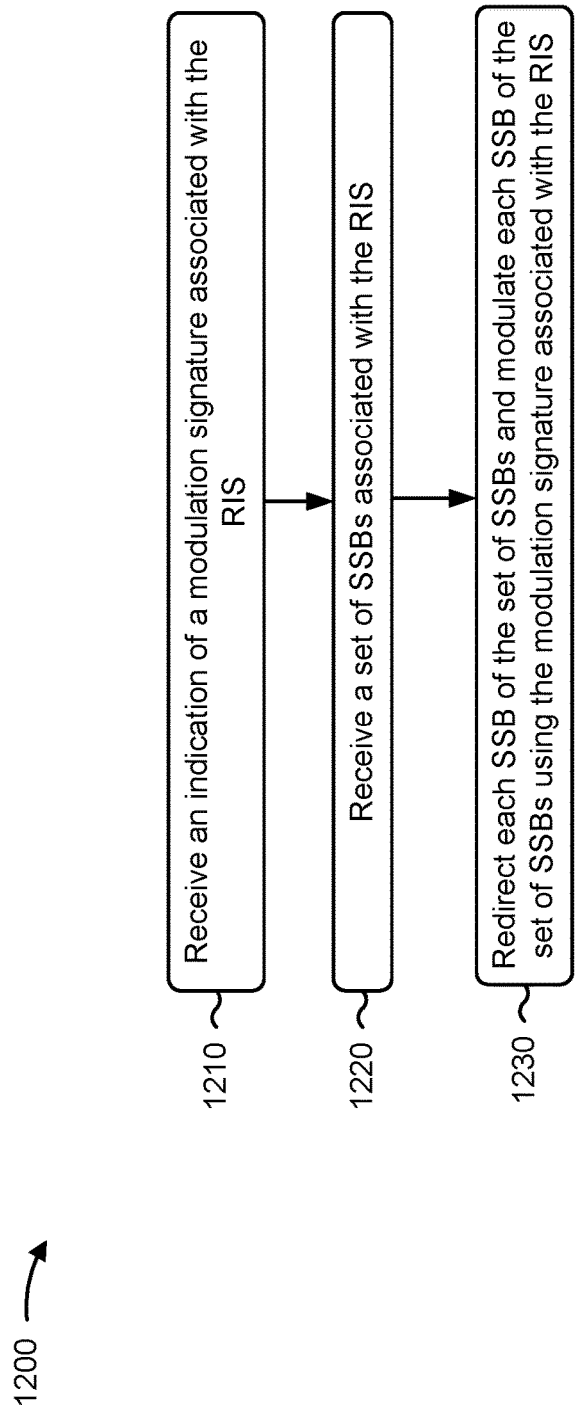

FIG. 12 is a diagram illustrating an example process 1200 performed, for example, by an RIS, in accordance with the present disclosure. Example process 1200 is an example where the RIS (e.g., RIS 705) performs operations associated with RIS-assisted SSB transmission and initial access.

As shown in FIG. 12, in some aspects, process 1200 may include receiving, from a base station, an indication of a modulation signature associated with the RIS (block 1210). For example, the RIS (e.g., using communication manager 170 and/or reception component 1502, depicted in FIG. 15) may receive, from a base station, an indication of a modulation signature associated with the RIS, as described above.

As further shown in FIG. 12, in some aspects, process 1200 may include receiving, from the base station, a set of SSBs associated with the RIS (block 1220). For example, the RIS (e.g., using communication manager 170 and/or reception component 1502, depicted in FIG. 15) may receive, from the base station, a set of SSBs associated with the RIS, as described above.

As further shown in FIG. 12, in some aspects, process 1200 may include redirecting each SSB of the set of SSBs and modulating each SSB of the set of SSBs using the modulation signature associated with the RIS (block 1230). For example, the RIS (e.g., using communication manager 170, reflection component 1508, and/or modulation component 1510, depicted in FIG. 15) may redirect each SSB of the set of SSBs and modulate each SSB of the set of SSBs using the modulation signature associated with the RIS, as described above.

Process 1200 may include additional aspects, such as any single aspect or any combination of aspects described below and/or in connection with one or more other processes described elsewhere herein.

In a first aspect, redirecting each SSB of the set of SSBs includes redirecting each SSB of the set of SSBs at a different reflection angle.

In a second aspect, alone or in combination with the first aspect, modulating each SSB of the set of SSBs using the modulation signature associated with the RIS includes modulating at least one of a phase, an amplitude, a frequency, or a polarization of each SSB of the set of SSBs at symbol boundaries of each SSB of the set of SSBs in accordance with the modulation signature associated with the RIS.

In a third aspect, alone or in combination with one or more of the first and second aspects, each SSB of the set of SSBs includes system information that includes RIS-assisted initial access information that identifies the set of SSBs associated with the RIS and the modulation signature associated with the RIS.

In a fourth aspect, alone or in combination with one or more of the first through third aspects, process 1200 includes receiving, from a UE, an initial access message in a random access channel resource associated with an SSB of the set of SSBs associated with the RIS, and redirecting the initial access message to the base station.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
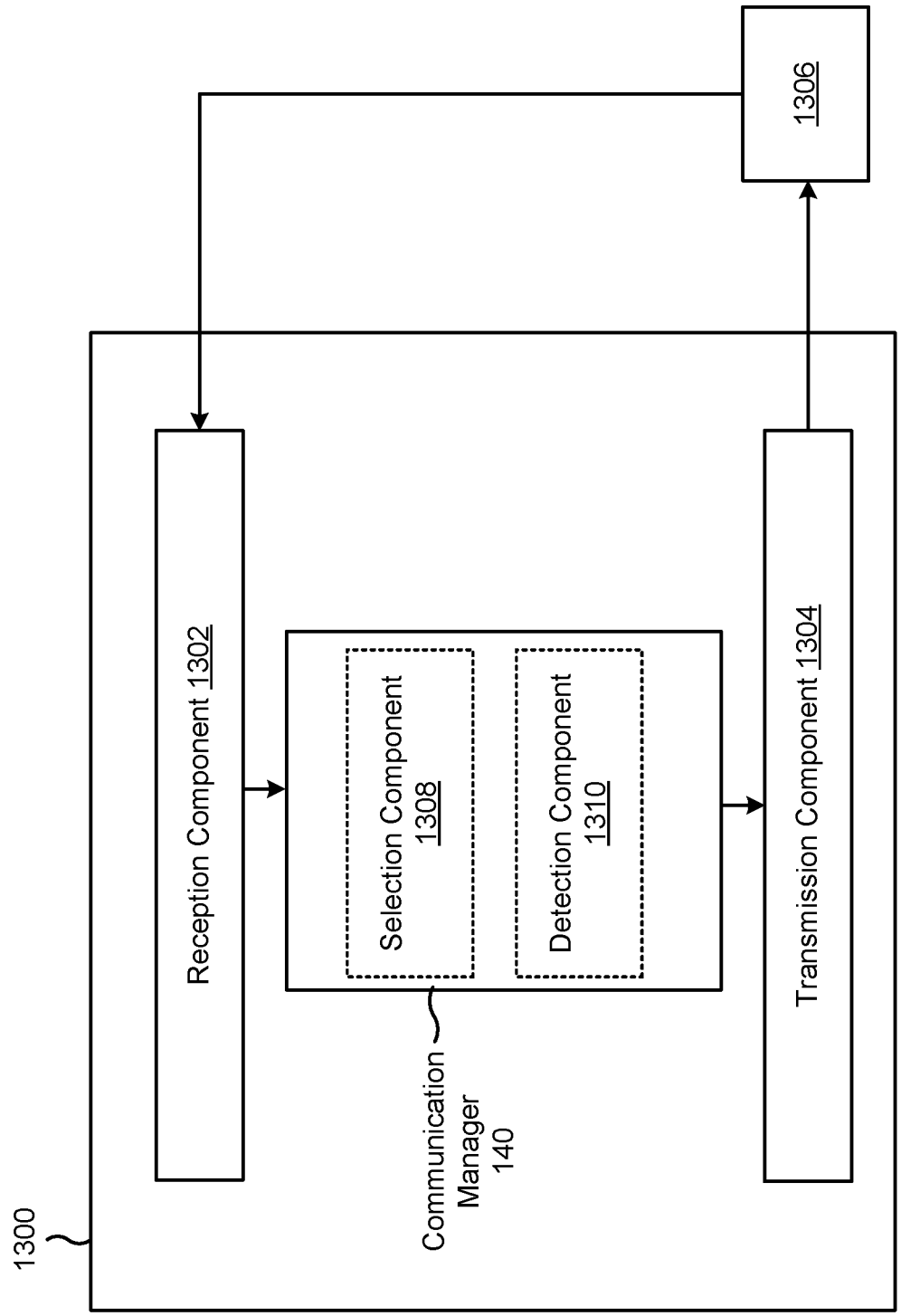
FIGS. 13-15 are diagrams of example apparatuses for wireless communication, in accordance with the present disclosure.

FIG. 13 is a diagram of an example apparatus 1300 for wireless communication. The apparatus 1300 may be a UE, or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 140. The communication manager 140 may include one or more of a selection component 1308 or a detection component 1310, among other examples.

In some aspects, the apparatus 1300 may be configured to perform one or more operations described herein in connection with FIGS. 6-8. Additionally, or alternatively, the apparatus 1300 may be configured to perform one or more processes described herein, such as process 900 of FIG. 9, or a combination thereof. In some aspects, the apparatus 1300 and/or one or more components shown in FIG. 13 may include one or more components of the UE described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the UE described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the UE described in connection with FIG. 2. In some aspects, the transmission component 1304 may be co-located with the reception component 1302 in a transceiver.

The reception component 1302 may receive an SSB transmitted by a base station. The reception component 1302 may receive system information that includes RIS or repeater assisted initial access information that identifies a set of SSBs that are associated with an RIS or a repeater and a modulation signature associated with the RIS or the repeater. The selection component 1308 may selectively perform initial access using the SSB or search for another SSB based at least in part on the RIS or repeater assisted initial access information.

The detection component 1310 may detect, in connection with a determination that the SSB is in the set of SSBs that are associated with the RIS or the repeater, whether the SSB is modulated with the modulation signature associated with the RIS or the repeater.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
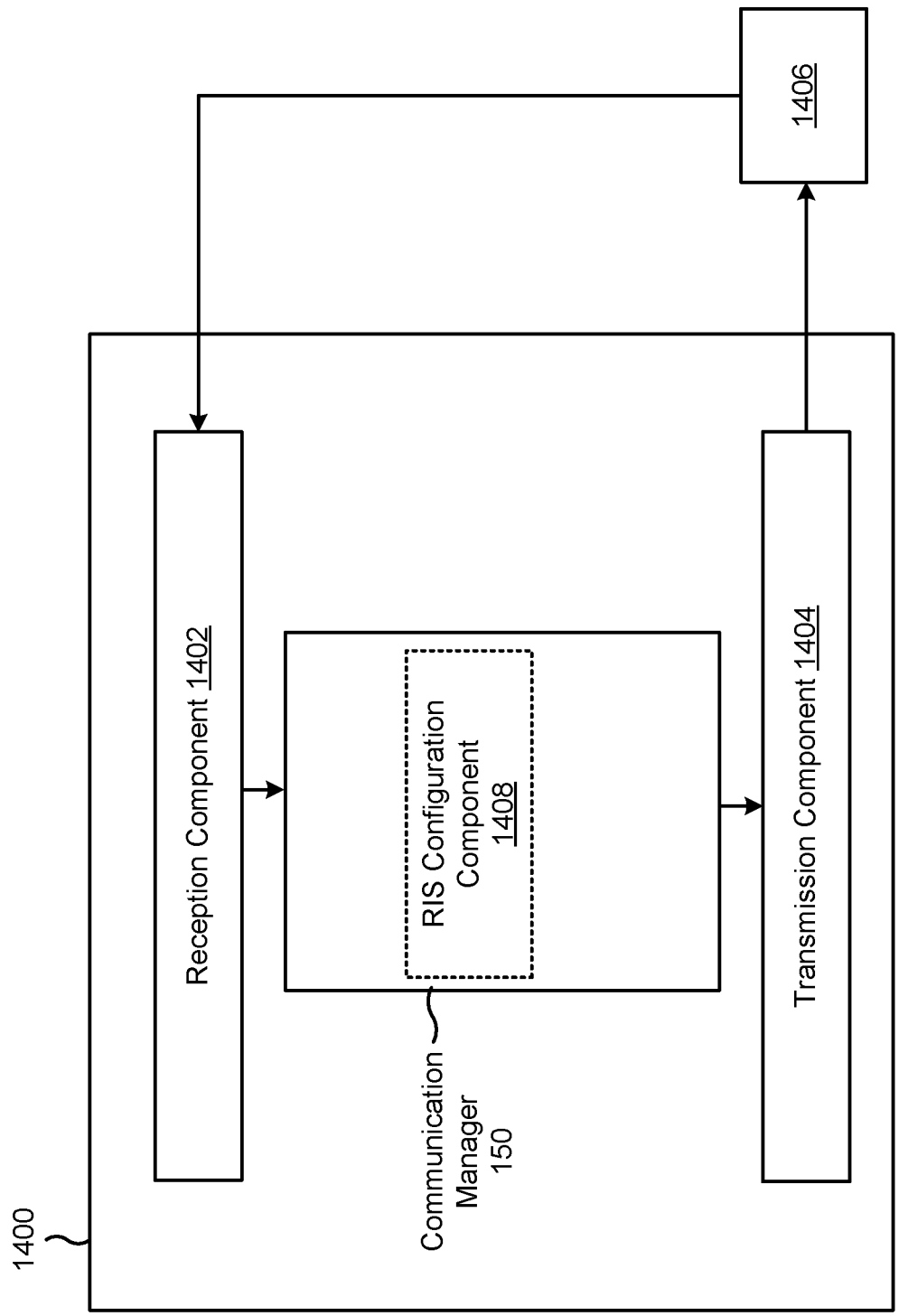

FIG. 14 is a diagram of an example apparatus 1400 for wireless communication. The apparatus 1400 may be a base station, or a base station may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include the communication manager 150. The communication manager 150 may include an RIS configuration component 1408, among other examples.

In some aspects, the apparatus 1400 may be configured to perform one or more operations described herein in connection with FIGS. 6-8. Additionally, or alternatively, the apparatus 1400 may be configured to perform one or more processes described herein, such as process 1000 of FIG. 10, process 1100 of FIG. 11, or a combination thereof. In some aspects, the apparatus 1400 and/or one or more components shown in FIG. 14 may include one or more components of the base station described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the base station described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the base station described in connection with FIG. 2. In some aspects, the transmission component 1404 may be co-located with the reception component 1402 in a transceiver.

The transmission component 1404 may transmit an SSB burst set including a first set of SSBs associated with direct transmission from the base station and a second set of SSBs associated with an RIS or a repeater. The transmission component 1404 may transmit system information including RIS or repeater assisted initial access information that identifies the second set of SSBs and a modulation signature associated with the RIS or the repeater.

The RIS configuration component 1408 may control the RIS or the repeater to redirect each SSB in the second set of SSBs and to modulate each SSB in the second set of SSBs by the modulation signature associated with the RIS or the repeater.

The transmission component 1404 may transmit one or more first SSBs associated with an RIS or a repeater on a beam directed toward the RIS or the repeater at a first power. The transmission component 1404 may transmit a second SSB associated with direct transmission from the base station, on a same beam as the one or more first SSBs or on a beam close to the beam on which the one or more first SSBs are transmitted, at a second power that is higher than the first power.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

Figure 15:
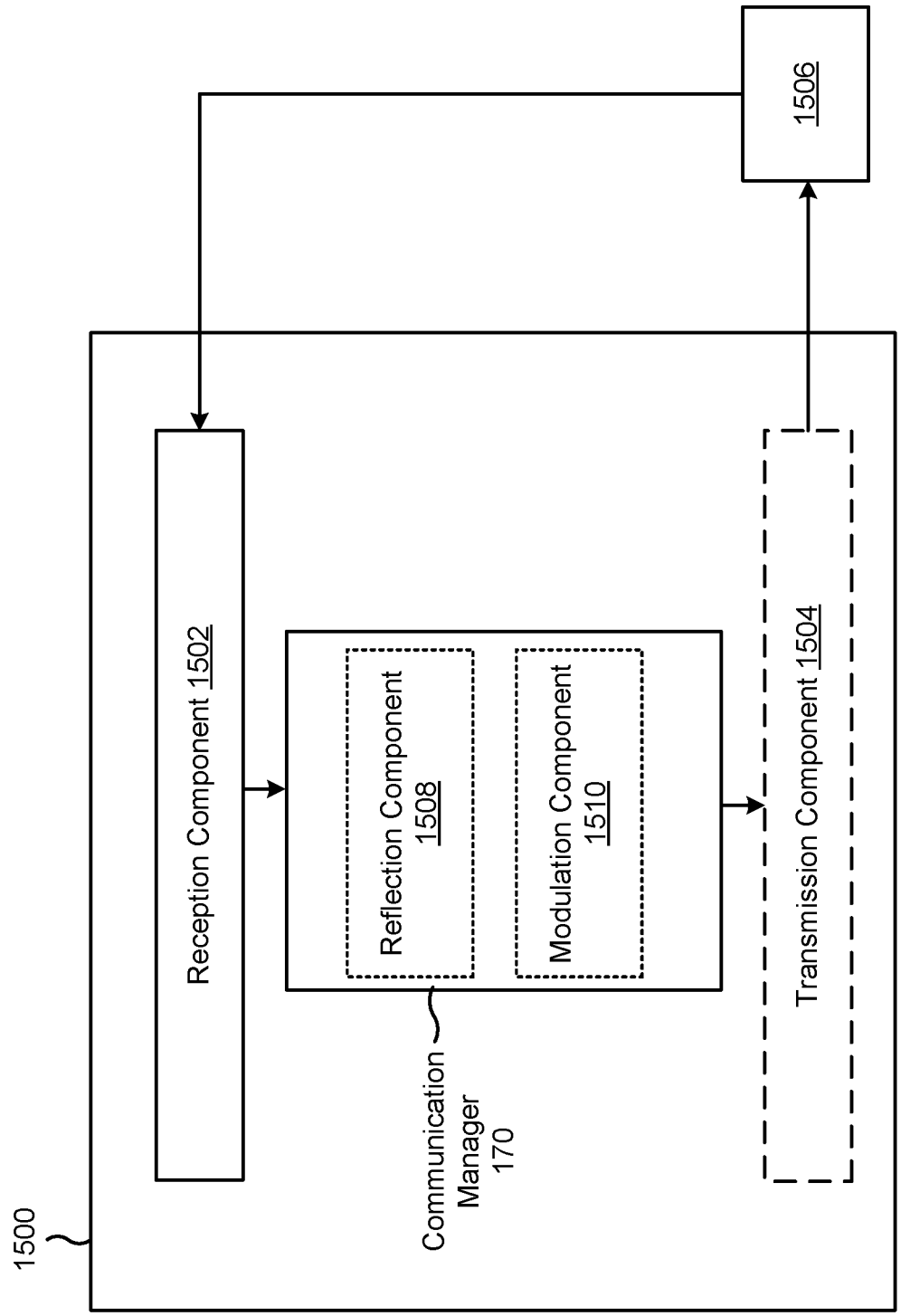

FIG. 15 is a diagram of an example apparatus 1500 for wireless communication. The apparatus 1500 may be an RIS, or an RIS may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include the communication manager 170. The communication manager 170) may include one or more of a reflection component 1508 and/or a modulation component 1510, among other examples.

In some aspects, the apparatus 1500 may be configured to perform one or more operations described herein in connection with FIGS. 6-8. Additionally, or alternatively, the apparatus 1500 may be configured to perform one or more processes described herein, such as process 1200 of FIG. 12, or a combination thereof. In some aspects, the apparatus 1500 and/or one or more components shown in FIG. 15 may include one or more components of the RIS described in connection with FIG. 2. Additionally, or alternatively, one or more components shown in FIG. 15 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1500. In some aspects, the reception component 1502 may include one or more antennas, a modem, a demodulator, a MIMO detector, a receive processor, a controller/processor, a memory, or a combination thereof, of the RIS described in connection with FIG. 2.

The transmission component 1504 may transmit communications, such as reference signals, control information, data communications, or a combination thereof, to the apparatus 1506. In some aspects, one or more other components of the apparatus 1500 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modem, a modulator, a transmit MIMO processor, a transmit processor, a controller/processor, a memory, or a combination thereof, of the RIS described in connection with FIG. 2. In some aspects, the transmission component 1504 may be co-located with the reception component 1502 in a transceiver. In some aspects, the RIS may not include a transmission component 1504.

The reception component 1502 may receive, from a base station, an indication of a modulation signature associated with the RIS. The reception component 1502 may receive, from the base station, a set of SSBs associated with the RIS. The reflection component 1508 may redirect each SSB of the set of SSBs, and the modulation component 1510 may modulate each SSB of the set of SSBs using the modulation signature associated with the RIS.

The reception component 1502 may receive, from a UE, an initial access message in a random access channel resource associated with an SSB of the set of SSBs associated with the RIS.

The reflection component 1508 may redirect the initial access message to the base station.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

The following provides an overview of some Aspects of the present disclosure:

Aspect 1: A method of wireless communication performed by a user equipment (UE), comprising: receiving a synchronization signal block (SSB) transmitted by a base station; receiving system information that includes reconfigurable intelligent surface (RIS) or repeater assisted initial access information that identifies a set of SSBs that are associated with an RIS or a repeater and a modulation signature associated with the RIS or the repeater; and selectively performing initial access using the SSB or searching for another SSB based at least in part on the RIS or repeater assisted initial access information.

Aspect 2: The method of Aspect 1, further comprising: detecting, in connection with a determination that the SSB is in the set of SSBs that are associated with the RIS or the repeater, whether the SSB is modulated with the modulation signature associated with the RIS or the repeater.

Aspect 3: The method of Aspect 2, wherein selectively performing initial access using the SSB or searching for another SSB comprises: performing initial access using the SSB based at least in part on detecting that the SSB is modulated with the modulation signature associated with the RIS or the repeater; or searching for another SSB to use to perform initial access based at least in part on detecting that the SSB is not modulated with the modulation signature associated with the RIS or the repeater.

Aspect 4: The method of Aspect 3, wherein performing initial access comprises: performing RIS-assisted initial access using the SSB based at least in part on detecting that the SSB is modulated with the modulation signature associated with the RIS or the repeater.

Aspect 5: The method of any of Aspects 1-4, wherein the modulation signature associated with the RIS or the repeater modulates at least one of a phase, an amplitude, a frequency, or a polarization at symbol boundaries of a signal redirected from the RIS or the repeater.

Aspect 6: The method of any of Aspects 1-6, wherein the RIS or repeater assisted initial access information indicates respective SSB indices for one or more SSBs in the set of SSBs that are associated with the RIS or the repeater.

Aspect 7: The method of any of Aspects 1 and 5-6, wherein selectively performing initial access using the SSB or searching for another SSB comprises: performing initial access using the SSB based at least in part on a determination that the SSB is not included in the set of SSBs associated with the RIS or the repeater.

Aspect 8: A method of wireless communication performed by a base station, comprising: transmitting a synchronization signal block (SSB) burst set including a first set of SSBs associated with direct transmission from the base station and a second set of SSBs associated with a reconfigurable intelligent surface (RIS) or a repeater; and transmitting system information including RIS or repeater assisted initial access information that identifies the second set of SSBs and a modulation signature associated with the RIS or the repeater.

Aspect 9: The method of Aspect 8, wherein the modulation signature associated with the RIS or the repeater modulates at least one of a phase, an amplitude, a frequency, or a polarization at symbol boundaries of a signal redirected from the RIS or the repeater.

Aspect 10: The method of any of Aspects 8-9, wherein transmitting the SSB burst set comprises: transmitting the second set of SSBs on a first beam toward the RIS or the repeater, wherein each SSB in the second set of SSBs is to be redirected by the RIS or the repeater and modulated by the RIS or repeater by the modulation signature associated with the RIS or the repeater.

Aspect 11: The method of Aspect 10, further comprising: controlling the RIS or the repeater to redirect each SSB in the second set of SSBs and to modulate each SSB in the second set of SSBs by the modulation signature associated with the RIS or the repeater.

Aspect 12: The method of any of Aspects 10-11, wherein transmitting the SSB burst set further comprises: transmitting an SSB in the first set of SSBs on the first beam or on a second beam that satisfies a distance threshold with respect to the first beam.

Aspect 13: The method of Aspect 12, wherein transmitting the second set of SSBs on the first beam comprises transmitting the second set of SSBs on the first beam at a first power, and wherein transmitting the SSB in the first SSB burst set on the first beam or on the second beam that satisfies the distance threshold with respect to the first beam comprises transmitting the SSB in the first SSB burst set on the first beam or on the second beam at a second power that is higher than the first power.

Aspect 14: The method of Aspect 13, wherein transmitting the SSB in the first SSB burst set on the first beam or on the second beam at the second power comprises: transmitting the SSB in the first SSB burst set on the first beam or on the second beam using an increased radiated power from each antenna element of one or more antenna elements of an antenna array of the base station, as compared with the radiated power used for transmitting the second set of SSBs on the first beam.

Aspect 15: The method of any of Aspects 13-14, wherein transmitting the SSB in the first SSB burst set on the first beam or on the second beam at the second power comprises: transmitting the SSB in the first SSB burst set on the first beam or on the second beam using an increased beamforming gain, as compared with a beamforming gain used for transmitting the second set of SSBs on the first beam, while maintaining a same beam direction.

Aspect 16: A method of wireless communication performed by a base station, comprising: transmitting one or more first synchronization signal blocks (SSBs) associated with a reconfigurable intelligent surface (RIS) or a repeater on a beam directed toward the RIS or the repeater at a first power; and transmitting a second SSB associated with direct transmission from the base station, on a same beam as the one or more first SSBs or on a beam that satisfies a distance threshold with respect to the beam on which the one or more first SSBs are transmitted, at a second power that is higher than the first power.

Aspect 17: The method of Aspect 16, wherein transmitting the second SSB at the second power comprises: transmitting the second SSB using an increased radiated power from each antenna element of one or more antenna elements of an antenna array of the base station, as compared with the radiated power used for transmitting the one or more first SSBs.

Aspect 18: The method of any of Aspects 16-17, wherein transmitting the second SSB at the second power comprises: transmitting the second SSB using an increased beamforming gain, as compared with a beamforming gain used for transmitting the one or more first SSBs, while maintaining a same beam direction.

Aspect 19: A method of wireless communication performed by a reconfigurable intelligent surface (RIS), comprising: receiving, from a base station, an indication of a modulation signature associated with the RIS; receiving, from the base station, a set of synchronization signal blocks (SSBs) associated with the RIS; and redirecting each SSB of the set of SSBs and modulating each SSB of the set of SSBs using the modulation signature associated with the RIS.

Aspect 20: The method of Aspect 19, wherein redirecting each SSB of the set of SSBs comprises: redirecting each SSB of the set of SSBs at a different reflection angle.

Aspect 21: The method of any of Aspects 19-20, wherein modulating each SSB of the set of SSBs using the modulation signature associated with the RIS comprises: modulating at least one of a phase, an amplitude, a frequency, or a polarization of each SSB of the set of SSBs at symbol boundaries of each SSB of the set of SSBs in accordance with the modulation signature associated with the RIS.

Aspect 22: The method of any of Aspects 19-21, wherein each SSB of the set of SSBs includes system information that includes RIS-assisted initial access information that identifies the set of SSBs associated with the RIS and the modulation signature associated with the RIS.

Aspect 23: The method of any of Aspects 19-22, further comprising: receiving, from a UE, an initial access message in a random access channel resource associated with an SSB of the set of SSBs associated with the RIS; and redirecting the initial access message to the base station.

Aspect 24: An apparatus for wireless communication at a device, comprising a processor; memory coupled with the processor; and instructions stored in the memory and executable by the processor to cause the apparatus to perform the method of one or more of Aspects 1-7.

Aspect 25: A device for wireless communication, comprising a memory and one or more processors coupled to the memory, the one or more processors configured to perform the method of one or more of Aspects 1-7.

Aspect 26: An apparatus for wireless communication, comprising at least one means for performing the method of one or more of Aspects 1-7.

Aspect 27: A non-transitory computer-readable medium storing code for wireless communication, the code comprising instructions executable by a processor to perform the method of one or more of Aspects 1-7.

Aspect 28: A non-transitory computer-readable medium storing a set of instructions for wireless communication, the set of instructions comprising one or more instructions that, when executed by one or more processors of a device, cause the device to perform the method of one or more of Aspects 1-7.

Aspect 29: An apparatus for wireless communication at a device, comprising a processor; memory coupled with the processor; and instructions stored in the memory and executable by the processor to cause the apparatus to perform the method of one or more of Aspects 8-15.

Aspect 30: A device for wireless communication, comprising a memory and one or more processors coupled to the memory, the one or more processors configured to perform the method of one or more of Aspects 8-15.

Aspect 31: An apparatus for wireless communication, comprising at least one means for performing the method of one or more of Aspects 8-15.

Aspect 32: A non-transitory computer-readable medium storing code for wireless communication, the code comprising instructions executable by a processor to perform the method of one or more of Aspects 8-15.

Aspect 33: A non-transitory computer-readable medium storing a set of instructions for wireless communication, the set of instructions comprising one or more instructions that, when executed by one or more processors of a device, cause the device to perform the method of one or more of Aspects 8-15.

Aspect 34: An apparatus for wireless communication at a device, comprising a processor; memory coupled with the processor; and instructions stored in the memory and executable by the processor to cause the apparatus to perform the method of one or more of Aspects 16-18.

Aspect 35: A device for wireless communication, comprising a memory and one or more processors coupled to the memory, the one or more processors configured to perform the method of one or more of Aspects 16-18.

Aspect 36: An apparatus for wireless communication, comprising at least one means for performing the method of one or more of Aspects 16-18.

Aspect 37: A non-transitory computer-readable medium storing code for wireless communication, the code comprising instructions executable by a processor to perform the method of one or more of Aspects 16-18.

Aspect 38: A non-transitory computer-readable medium storing a set of instructions for wireless communication, the set of instructions comprising one or more instructions that, when executed by one or more processors of a device, cause the device to perform the method of one or more of Aspects 16-18.

Aspect 39: An apparatus for wireless communication at a device, comprising a processor; memory coupled with the processor; and instructions stored in the memory and executable by the processor to cause the apparatus to perform the method of one or more of Aspects 19-23.

Aspect 40: A device for wireless communication, comprising a memory and one or more processors coupled to the memory, the one or more processors configured to perform the method of one or more of Aspects 19-23.

Aspect 41: An apparatus for wireless communication, comprising at least one means for performing the method of one or more of Aspects 19-23.

Aspect 42: A non-transitory computer-readable medium storing code for wireless communication, the code comprising instructions executable by a processor to perform the method of one or more of Aspects 19-23.

Aspect 43: A non-transitory computer-readable medium storing a set of instructions for wireless communication, the set of instructions comprising one or more instructions that, when executed by one or more processors of a device, cause the device to perform the method of one or more of Aspects 19-23.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
    a memory; and
    one or more processors, coupled to the memory, configured to:
        receive a synchronization signal block (SSB) transmitted by a base station;
        receive system information that includes initial access information that is reconfigurable intelligent surface (RIS) assisted initial access information or repeater assisted initial access information, the initial access information identifying a set of SSBs that are associated with an RIS or a repeater and the initial access information identifying a modulation signature associated with the RIS or the repeater; and
        select between performing initial access using the SSB and searching for another SSB based at least in part on the initial access information.

2. The UE of claim 1, wherein the one or more processors are further configured to:
    detect, in connection with a determination that the SSB is in the set of SSBs that are associated with the RIS or the repeater, whether the SSB is modulated with the modulation signature associated with the RIS or the repeater.

3. The UE of claim 2, wherein the one or more processors, to select between performing initial access using the SSB and searching for another SSB, are configured to:
    perform initial access using the SSB based at least in part on detecting that the SSB is modulated with the modulation signature associated with the RIS or the repeater; or
    search for another SSB to use to perform initial access based at least in part on detecting that the SSB is not modulated with the modulation signature associated with the RIS or the repeater.

4. The UE of claim 3, wherein the one or more processors, to perform initial access, are configured to:
    perform RIS-assisted initial access using the SSB based at least in part on detecting that the SSB is modulated with the modulation signature associated with the RIS or the repeater.

5. The UE of claim 2, wherein the modulation signature associated with the RIS or the repeater modulates at least one of a phase, an amplitude, a frequency, or a polarization at symbol boundaries of a signal redirected from the RIS or the repeater.

6. The UE of claim 1, wherein the initial access information indicates respective SSB indices for one or more SSBs in the set of SSBs that are associated with the RIS or the repeater.

7. The UE of claim 1, wherein the one or more processors, to select between performing initial access using the SSB and searching for another SSB, are configured to:
perform initial access using the SSB based at least in part on a determination that the SSB is not included in the set of SSBs associated with the RIS or the repeater.

8. A network entity for wireless communication, comprising:
a memory; and
one or more processors, coupled to the memory, configured to:
transmit a synchronization signal block (SSB) burst set including a first set of SSBs associated with direct transmission from the network entity and a second set of SSBs associated with a reconfigurable intelligent surface (RIS) or a repeater; and
transmit system information including initial access information that is RIS assisted initial access information or repeater assisted initial access information, the initial access information identifying the second set of SSBs as being associated with the RIS or the repeater and the initial access information identifying a modulation signature associated with the RIS or the repeater.

9. The network entity of claim 8, wherein the modulation signature associated with the RIS or the repeater modulates at least one of a phase, an amplitude, a frequency, or a polarization at symbol boundaries of a signal redirected from the RIS or the repeater.

10. The network entity of claim 8, wherein the one or more processors, to transmit the SSB burst set, are configured to:
transmit the second set of SSBs on a first beam toward the RIS or the repeater, wherein each SSB in the second set of SSBs is to be redirected by the RIS or the repeater and each SSB in the second set of SSBs is to be modulated by the RIS or repeater by the modulation signature associated with the RIS or the repeater.

11. The network entity of claim 10, wherein the one or more processors are further configured to:
control the RIS or the repeater to redirect each SSB in the second set of SSBs and to modulate each SSB in the second set of SSBs by the modulation signature associated with the RIS or the repeater.

12. The network entity of claim 10, wherein the one or more processors, to transmit the SSB burst set, are further configured to:
transmit an SSB in the first set of SSBs on the first beam or on a second beam that satisfies a distance threshold with respect to the first beam.

13. The network entity of claim 12, wherein the one or more processors, to transmit the second set of SSBs on the first beam, are configured to transmit the second set of SSBs on the first beam at a first power, and wherein the one or more processors, to transmit the SSB in the first SSB burst set on the first beam or on the second beam that satisfies the distance threshold with respect to the first beam, are configured to transmit the SSB in the first SSB burst set on the first beam or on the second beam at a second power that is higher than the first power.

14. The network entity of claim 13, wherein the one or more processors, to transmit the SSB in the first SSB burst set on the first beam or on the second beam at the second power, are configured to:
transmit the SSB in the first SSB burst set on the first beam or on the second beam using an increased radiated power from each antenna element of one or more antenna elements of an antenna array of the network entity, as compared with the radiated power used for transmitting the second set of SSBs on the first beam.

15. The network entity of claim 13, wherein the one or more processors, to transmit the SSB in the first SSB burst set on the first beam or on the second beam at the second power, are configured to:
transmit the SSB in the first SSB burst set on the first beam or on the second beam using an increased beamforming gain, as compared with a beamforming gain used for transmitting the second set of SSBs on the first beam, while maintaining a same beam direction.

16. A method of wireless communication performed by a user equipment (UE), the method comprising:
receiving a synchronization signal block (SSB) transmitted by a base station;
receiving system information that includes initial access information that is reconfigurable intelligent surface (RIS) assisted initial access information or repeater assisted initial access information, the initial access information identifying a set of SSBs that are associated with an RIS or a repeater and the initial access information identifying a modulation signature associated with the RIS or the repeater; and
selecting between performing initial access using the SSB and searching for another SSB based at least in part on the initial access information.

17. The method of claim 16, further comprising:
detecting, in connection with a determination that the SSB is in the set of SSBs that are associated with the RIS or the repeater, whether the SSB is modulated with the modulation signature associated with the RIS or the repeater.

18. The method of claim 17, wherein selecting between performing initial access using the SSB and searching for another SSB comprises:
performing initial access using the SSB based at least in part on detecting that the SSB is modulated with the modulation signature associated with the RIS or the repeater; or
searching for another SSB to use to perform initial access based at least in part on detecting that the SSB is not modulated with the modulation signature associated with the RIS or the repeater.

19. The method of claim 18, wherein performing initial access comprises:
performing RIS-assisted initial access using the SSB based at least in part on detecting that the SSB is modulated with the modulation signature associated with the RIS or the repeater.

20. The method of claim 17, wherein the modulation signature associated with the RIS or the repeater modulates at least one of a phase, an amplitude, a frequency, or a polarization at symbol boundaries of a signal redirected from the RIS or the repeater.

21. The method of claim 16, wherein the initial access information indicates respective SSB indices for one or more SSBs in the set of SSBs that are associated with the RIS or the repeater.

22. The method of claim 16, wherein selecting between performing initial access using the SSB and searching for another SSB comprises:
performing initial access using the SSB based at least in part on a determination that the SSB is not included in the set of SSBs associated with the RIS or the repeater.

23. A method of wireless communication performed by a network entity, the method comprising:
transmitting a synchronization signal block (SSB) burst set including a first set of SSBs associated with direct transmission from the network entity and a second set of SSBs associated with a reconfigurable intelligent surface (RIS) or a repeater; and
transmitting system information including initial access information that is RIS assisted initial access information or repeater assisted initial access information, the initial access information identifying the second set of SSBs as being associated with the RIS or the repeater and the initial access information identifying a modulation signature associated with the RIS or the repeater.

24. The method of claim 23, wherein the modulation signature associated with the RIS or the repeater modulates at least one of a phase, an amplitude, a frequency, or a polarization at symbol boundaries of a signal redirected from the RIS or the repeater.

25. The method of claim 23, wherein transmitting the SSB burst set comprises:
transmitting the second set of SSBs on a first beam toward the RIS or the repeater, wherein each SSB in the second set of SSBs is to be redirected by the RIS or the repeater and each SSB in the second set of SSBs is to be modulated by the RIS or repeater by the modulation signature associated with the RIS or the repeater.

26. The method of claim 25, further comprising:
controlling the RIS or the repeater to redirect each SSB in the second set of SSBs and to modulate each SSB in the second set of SSBs by the modulation signature associated with the RIS or the repeater.

27. The method of claim 25, wherein transmitting the SSB burst set further comprises:
transmitting an SSB in the first set of SSBs on the first beam or on a second beam that satisfies a distance threshold with respect to the first beam.

28. The method of claim 27, wherein transmitting the second set of SSBs on the first beam comprises transmitting the second set of SSBs on the first beam at a first power, and wherein transmitting the SSB in the first SSB burst set on the first beam or on the second beam that satisfies the distance threshold with respect to the first beam comprises transmitting the SSB in the first SSB burst set on the first beam or on the second beam at a second power that is higher than the first power.

29. The method of claim 28, wherein transmitting the SSB in the first SSB burst set on the first beam or on the second beam at the second power comprises:
transmitting the SSB in the first SSB burst set on the first beam or on the second beam using an increased radiated power from each antenna element of one or more antenna elements of an antenna array of the network entity, as compared with the radiated power used for transmitting the second set of SSBs on the first beam.

30. The method of claim 28, wherein transmitting the SSB in the first SSB burst set on the first beam or on the second beam at the second power comprises:
transmitting the SSB in the first SSB burst set on the first beam or on the second beam using an increased beamforming gain, as compared with a beamforming gain used for transmitting the second set of SSBs on the first beam, while maintaining a same beam direction.

* * * * *